US010269151B1

(12) United States Patent
Batra et al.

(10) Patent No.: US 10,269,151 B1
(45) Date of Patent: Apr. 23, 2019

(54) EFFICIENTLY RENDERING CUBIC BEZIER CURVES TO PRODUCE ACCURATE ANTI-ALIASED CONTENT

(71) Applicant: Adobe Inc., San Jose, CA (US)

(72) Inventors: Vineet Batra, Delhi (IN); Harish Kumar, Noida (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/728,676

(22) Filed: Oct. 10, 2017

(51) Int. Cl.
G06T 11/20 (2006.01)
G06T 1/20 (2006.01)

(52) U.S. Cl.
CPC .............. G06T 11/203 (2013.01); G06T 1/20 (2013.01); G06T 2200/12 (2013.01)

(58) Field of Classification Search
USPC .......................................................... 345/611
See application file for complete search history.

(56) References Cited

U.S. PATENT DOCUMENTS

| 6,014,148 | A | * | 1/2000 | Tankelevich | G06T 11/203 |
| | | | | | 345/442 |
| 6,606,093 | B1 | * | 8/2003 | Gossett | G06T 11/203 |
| | | | | | 345/4 |
| 2005/0156930 | A1 | * | 7/2005 | Nishioka | G06T 11/40 |
| | | | | | 345/442 |
| 2006/0244748 | A1 | * | 11/2006 | Long | G06T 11/40 |
| | | | | | 345/422 |
| 2012/0075310 | A1 | * | 3/2012 | Michail | G06T 11/203 |
| | | | | | 345/442 |
| 2012/0229485 | A1 | * | 9/2012 | Rhodes | G09G 5/246 |
| | | | | | 345/545 |
| 2012/0287135 | A1 | * | 11/2012 | Pfeifle | G06T 11/203 |
| | | | | | 345/442 |
| 2014/0173394 | A1 | * | 6/2014 | Kashibuchi | G06F 17/211 |
| | | | | | 715/201 |
| 2015/0067484 | A1 | * | 3/2015 | Sumio | G06F 3/04883 |
| | | | | | 715/251 |

OTHER PUBLICATIONS

Diego Nehab, Hugues Hoppe; "Random-Access Rendering of General Vector Graphics," Journal: ACM Transactions on Graphics (TOG)—Proceedings of ACM SIGGRAPH (SpecialInterest Group on Computer Graphics and Interactive Techniques), Asia 2008; vol. 27 Issue 5; Dec. 10, 2008; Article No. 135.

* cited by examiner

Primary Examiner — Wesner Sajous
(74) Attorney, Agent, or Firm — Keller Jolley Preece

(57) ABSTRACT

The present disclosure relates to a rendering system that that accurately and efficiently renders regions bounded by cubic Bezier splines. For example, in some embodiments, the rendering system generates control triangles, interior triangles, and anti-aliasing triangles from cubic Bezier spline segments of a vector-based convex object. Based on the generated triangles, the rendering system renders anti-aliased cubic Bezier splines as well as the geometry within the cubic Bezier splines. In one or more embodiments, the rendering system efficiently allocates computations between a central processing unit (CPU) and graphics processing unit (GPU) of a computing device in a manner that significantly reduces computational and memory resources.

20 Claims, 14 Drawing Sheets

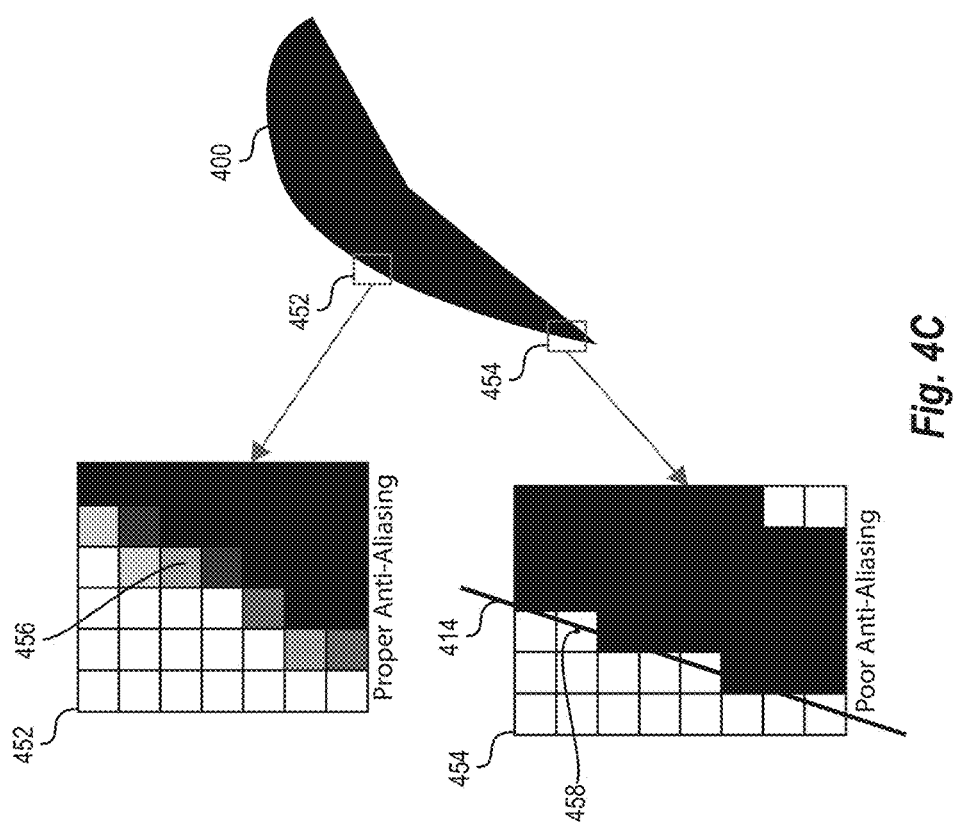
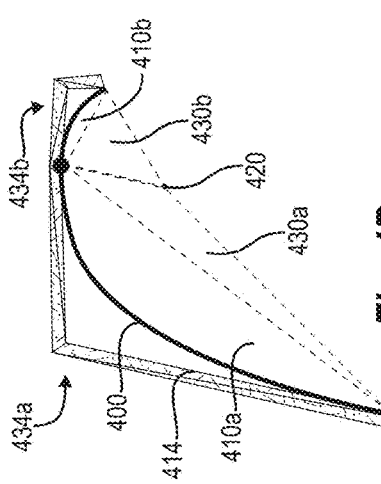
Fig. 4A
Fig. 4B
Fig. 4C

EFFICIENTLY RENDERING CUBIC BEZIER CURVES TO PRODUCE ACCURATE ANTI-ALIASED CONTENT

BACKGROUND

Conventional computer graphic systems enable users to create various types of computer graphics content such as free form illustration, engineering design, or other types of technical or non-technical computer graphics. Often, these conventional systems employ vector-based curves, such as Bezier curves, which are represented by compact mathematical equations having a fixed number of parameters. In addition, conventional systems often employ a graphics rendering model called a graphics pipeline to display two-dimensional and three-dimensional data on a display. A typical graphics pipeline generally includes processing data using both a central processing unit (CPU) and graphics processing unit (GPU) of a computing device. As one example, the CPU first processes data associated with a Bezier curve. This data is passed to the GPU to graphically render the data on a display.

In general, conventional systems rendering using GPUs employ one of two approaches to render cubic Bezier curves: curve approximation by degree reduction or two-pass stencil and cover. Although conventional systems can produce adequate results in some applications, there remains a number of problems and disadvantages with respect to conventional processing and rendering of geometry bounded by cubic Bezier splines. In particular, the curve approximation fails to accurately render the bounded geometry in a resolution independent fashion especially at high scale values, while the two pass stencil and cover technique relies on multisampling to produce a smooth appearance, which requires significant memory. Moreover, conventional systems using the curve approximation and/or the two-pass stencil approach use excessive computer resources (e.g., a large processor and memory footprint), which degrades performance of conventional systems when rendering Bezier curves.

For example, under the curve approximation approach, conventional systems approximate a curve by dividing a single cubic Bezier curve into several quadratic Bezier curves and/or straight-line segments. The curve approximation approach, however, often creates aberrations from the original geometry of the cubic Bezier curve (e.g., approximation error), and thus results in an inaccurate curve. Further, the curve approximation approach is computationally expensive on the CPU, increases data transfer times from the CPU to the GPU, and requires significant computer memory resources. Depending on various factors, conventional systems can apply a large approximation tolerance, which results in minimizing the number of quadratic segments (e.g., 5-10) to process per cubic Bezier curve. With a large approximation tolerance, however, the inaccuracy of the approximated curve often increases and creates noticeable artifact when the approximated curve is rendered. In addition, when a user zooms in on the approximated curve, the inaccuracies of the approximation become more apparent due to amplification of the approximation error.

In an attempt to overcome the poor results of a large approximation tolerance, conventional systems can decrease the approximation tolerance. With a low approximation tolerance, the curve approximation approach produces a large number of quadratic Bezier curve segments (e.g., 20-50). A large number of quadratic Bezier curve segments requires the CPU to process large amounts data, the CPU to pass large amounts of data to the GPU, and the GPU to render the large amount of data. Thus, a low approximation tolerance results in a computationally expensive process that significantly degrades performance of the system. Further, even with a low approximation tolerance, because the rendered curve is still an approximation, inaccuracies with the approximated curve are often still noticeable.

The two-pass stencil and cover approach also suffers from several disadvantages. Under the two-pass stencil and cover approach, conventional systems render the cubic Bezier curve into a stencil directly on the GPU of a computing device, which provides coverage of the cubic Bezier curve. Then, conventional systems perform a second pass to fill in each of the pixels on the coverage. While the two-pass approach can be more accurate than the approximate approach, it is inefficient, computationally expensive, and results in significant performance bottlenecks at the GPU. In addition, the two-pass stencil and cover approach often produces noticeable aliasing, which can result in an inaccurate and jagged curve appearance.

Because each of the above approaches results in inaccurate and aliased curves, some conventional systems further use multisampling anti-aliasing (MSAA) in an attempt to correct aliased pixels on a rendered curve. However, MSAA further requires large allocations of memory (e.g., often 8 times the size of the sample) to perform anti-aliasing. Thus, MSAA adds significantly more memory requirements to the above-constrained approaches, which already require a large memory footprint and processing resources to render a cubic Bezier curve. In addition, as display densities or artwork complexity increase, performance degradation significantly increases, resulting in a significantly computationally inefficient system that requires high memory and computational bandwidth that often fails to render cubic Bezier curves accurately.

SUMMARY

One or more embodiments of the present disclosure provide benefits and/or solve one or more of the preceding (or other problems) in the art, with systems, computer-readable media, and methods that accurately and efficiently render geometry bounded by cubic Bezier splines. In one or more embodiments, upon identifying a vector-based object that includes a cubic Bezier spline, the systems and methods perform pre-processing on a CPU of a computing device that splits the cubic Bezier spline into segments, and generates a simplified data representation of each cubic Bezier spline segment. With respect to a single cubic Bezier spline segment, the systems and methods transfer the simplified data representation of the cubic Bezier spline segment to a GPU of the computing device. Based on the simplified data representation, the GPU generates reference geometries for the cubic Bezier spline segment. Using the reference geometries for the Bezier spline segment, the systems and methods generate an anti-aliased rendering of the cubic Bezier spline segment that results in a smooth and accurate spline.

By simplifying a cubic Bezier spline on the CPU, and generating the reference geometries on the GPU, the systems and methods save CPU processing time, and reduce CPU to GPU data transfer time. Accordingly, the systems and methods allocate operations between a CPU and GPU of a computing device in a manner that efficiently uses computational and memory resources to render a cubic Bezier spline. In addition, the generation of the reference geometries on the GPU provides a resolution independent result (e.g., the appearance and accuracy of a spline does not change when a user zooms in on the spline). Thus, the systems and methods perform effective and accurate anti-aliasing on cubic Bezier splines, resulting in smooth and accurate spline rendering.

The following description sets forth additional features and advantages of one or more embodiments of the disclosed systems and methods. In some cases, such features and advantages will be obvious to a skilled artisan from the description or can be learned by the practice of the disclosed embodiments.

BRIEF DESCRIPTION OF THE DRAWINGS

The detailed description describes one or more embodiments with additional specificity and detail through the use of the accompanying drawings, as briefly described below.

FIGS. 4A-4C illustrates an example of accurate anti-aliasing when rendering a cubic Bezier spline in accordance with one or more embodiments.

DETAILED DESCRIPTION

Figure 1:
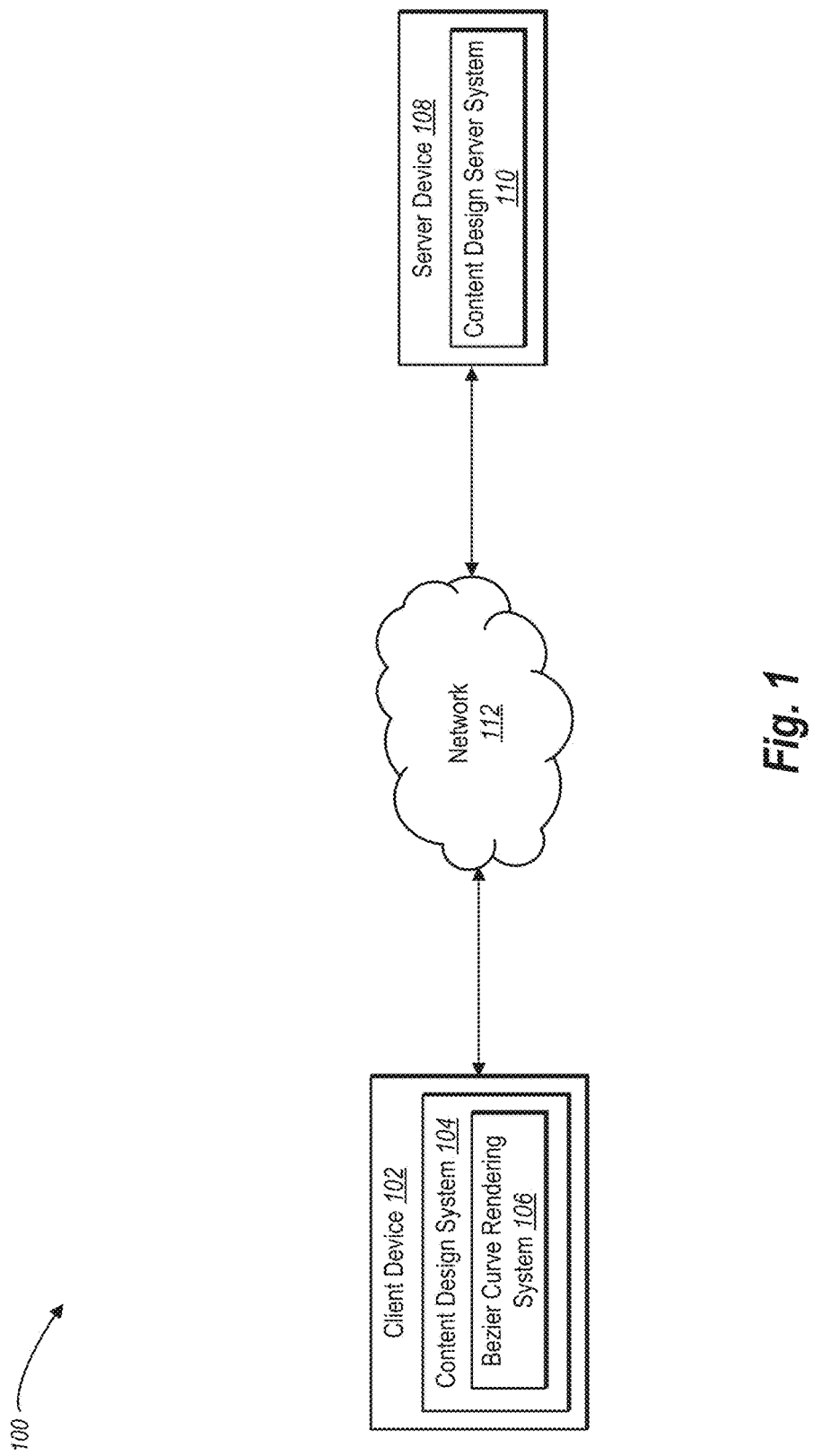
FIG. 1 illustrates a schematic diagram of an exemplary environment in which a rendering system can be implemented in accordance with one or more embodiments.

This disclosure describes one or more embodiments of a Bezier spline rendering system (or simply "rendering system") that accurately and efficiently renders convex geometry bounded by a cubic Bezier spline (e.g., a cubic Bezier curve). As described in detail below, embodiments of the rendering system graphically render cubic Bezier splines with higher accuracy and fewer computer resource requirements than conventional systems. In particular, the rendering system uniquely allocate various processes and operations between a computer processing unit (CPU) and a graphical processing unit (GPU) of a computer device in a manner that reduces CPU time, as well as decreases CPU to GPU data transfer time. Further, the rendering system provides a resolution independent technique that maintains an anti-aliased and smooth appearance even when the cubic Bezier spline is enlarged on a display of a computing device (e.g., zoomed-in view).

In one or more embodiments, the rendering system identifies a vector-based object that includes one or more cubic Bezier splines. Upon identifying a cubic Bezier spline, the rendering system categorizes the cubic Bezier spline (e.g., cusp, loop, or serpentine cubic Bezier spline), and based on the categorization, identifies cubic Bezier spline segments of the cubic Bezier spline. Accordingly, and as described in further detail below, the rendering system generates a rendering the cubic Bezier spline by analyzing each of the cubic Bezier spline segments individually, and then combining the rendering results for each cubic Bezier segment to render the entire cubic Bezier spline.

In various example embodiments, upon identifying a given cubic Bezier spline segment (or simply "segment"), the rendering system pre-processes the segment on the CPU to simplify the segment, or in other words, create a simplified data representation of the segment. As part of simplifying segment, the rendering system splits the segment into two or more segment portions, where each segment portion is monotonic (e.g., segment portions do not have an inflection point). Generating monotonic segment portions allows the rendering system to efficiently generate a compact data representation of each segment portion to provide to the GPU.

For example, in one or more embodiments, the rendering system generates a control triangle as part of the data representation of a given segment portion. In particular, because the segment portion is monotonic, the rendering system generates a control triangle that fully encompasses the segment portion (e.g., the segment portion is contained within the control triangle). Because the control triangle fully encompasses the segment portion, the rendering system can generate various data points relative to the control triangle that provide an efficient and accurate representation of the segment portion. For instance, the rendering system generates a memory efficient data package that includes vertex attribute data (including color of each vertex), control triangle attributes, and segment portion attributes for the segment portion.

After the CPU completes the simplification process, the rendering system causes the CPU to transfer the simplified data representation of the segment to the GPU. Using the data representation of the segment, the rendering system generates various reference triangles directly on the GPU for a given segment portion, where the reference triangles are ultimately used to render the segment portion. For example, the rendering system generates reference triangles that include an interior triangle and anti-aliasing triangles for the segment portion. Generally, the interior triangle defines an area that is within an interior region of the segment portion (e.g., an area under and within the spline), and the anti-aliasing triangles define a uniform offset spread around the segment portion boundary.

Using the control triangle (generated previously on the CPU), the interior triangle, and the anti-aliasing triangles, the rendering system proceeds to cause the GPU to render the segment portion for display on a computer device. In particular, the rendering system uses the geometry of the control triangle, the interior triangle, and the anti-aliasing triangles to determine the color, or shade of color, of pixels with respect to the segment portion. For example, for areas within the interior triangle, the rendering system assigns the pixels a color (or texture pattern) according to the color data corresponding to the segment portion. In addition, the rendering system assigns the color to the pixels that are within the control triangle and also inside the segment portion.

With respect to the pixels within the control triangle, but outside the segment portion, the rendering system assigns these pixels a color based on their distance from the segment portion. Further, depending on geometric attributes of a particular segment portion, the rendering system assigns one or more pixels within the anti-aliasing triangles to the given color, or a fractional value of the given color, based on the distance of the pixels within the anti-aliasing triangles to the segment portion. For instance, based on the distance of a pixel within the anti-aliasing triangles from the segment portion, the rendering system can assign a lighter shade of the given color to pixels to create an anti-aliased segment portion (e.g., a spline with a smooth appearance).

The rendering system uses the assigned color values to each pixel to accurately render the segment portion. By rendering each segment portion using the above principles, the rendering system ultimately renders the entire cubic Bezier spline in a computationally efficient and accurate manner. Indeed, the rendering system has several advantages over conventional systems. In particular, the rendering system renders a cubic Bezier spline in a much more computationally efficient manner compared to conventional systems (e.g., the rendering system requires significantly less computational and memory resources). Specifically, the rendering system accurately generates a simplified data representation of cubic Bezier spline segments that is computationally inexpensive to generate on a CPU, and is efficiently and quickly transferred from the CPU to the GPU.

In addition, and as described above, the rendering system generates the simplified data representation of a cubic Bezier spline segment is based on a triangle data points (triangle points and lines). Significantly, triangles are the basic rendering construct of GPU hardware. Accordingly, generating the simplified data representation based on triangle data points greatly streamlines the rendering process by allowing the GPU to generate additional triangles (e.g., interior triangles and anti-aliased triangles) based on the triangle data points within the simplified data representation, which uses minimal GPU resources as GPU hardware is specifically designed to generate and construct triangles.

Moreover, the triangular representation and analysis further allows the rendering system to perform anti-aliasing operations directly on the GPU within the geometry shader stage of the graphics rendering pipeline, resulting in a significant performance improvement when compared to conventional systems. For instance, due to the rendering system performs the majority of the rendering operations directly on the GPU, the amount of data transferred between the CPU and the GPU is minimal compared to conventional systems.

Furthermore, during pre-processing, the rendering system creates the simplified data representation of a Bezier spline segment in a resolution agnostic manner. This allows the rendering system to store the data representation in a memory cache, and the GPU can access and use the stored data representation to render the cubic Bezier spline regardless of a requested display resolution (e.g., in response to a user providing a zoom-in request). In this manner, the CPU only needs to pre-process a cubic Bezier spline once, and the GPU can render the cubic Bezier spline at any requested display resolution using the same stored data representation of the cubic Bezier spline. Contrary to the disclosed rendering system, conventional systems typically require the CPU to completely re-process a spline each time the display resolution changes. Moreover, conventional systems also perform tessellation of interior triangles at the CPU, which significantly increases CPU processing time, requires a larger memory cache, and increases data transfer times to the GPU.

Notably, despite the significant increases in computational efficiency the rendering system provides, the rendering system also improves the accuracy and appearance of a rendered cubic Bezier spline. In particular, the rendering system does not approximate the cubic Bezier spline when generating the simplified data representation of a cubic Bezier spline at the CPU. Thus, the rendering system does not introduce any approximation error, as do most conventional systems. Additionally, and as will be described in further detail below, the anti-aliasing techniques of the render system provide a more accurate and noticeably better rendering of cubic Bezier splines compared to conventional systems, or in other words, the rendering system generates smooth splines as opposed to the often-jagged splines that conventional systems provide.

Referring now to the figures, FIG. 1 illustrates a schematic diagram of an exemplary environment 100 within which a Bezier spline rendering system 106 can operate (or simply "rendering system 106). In one or more embodiments, the exemplary environment 100 includes a client device 102, a server device 108, and a network 112. The network 112 can be any suitable network over which the computing devices can communicate. Example and features of computing devices (e.g., the client device 102 and the server device 108) and networks (e.g., the network 112) are discussed in more detail below with regard to FIG. 10.

As illustrated in FIG. 1, the environment 100 includes the client device 102 having a content design system 104 as well as the rendering system 106. The content design system 104 generally facilitates the creation, modification, sharing, and/or deletion of graphical content including vector-based content. In one or more embodiments, the content design system 104 is a design application such as ADOBE® ILLUSTRATOR®. In other embodiments, the content design system 104 includes multiple applications, functions, and operations relating to graphical content, such as an application suite, a web-based application and/or system operations on the client device 102.

As shown in FIG. 1, the content design system 104 includes the rendering system 106. In some embodiments, however, the rendering system 106 is located on the client device apart from the content design system 104. As mentioned above, and as will be explained in detail below, the rendering system 106 renders cubic Bezier splines (e.g., cubic Bezier curves) using various approaches and techniques. As also described previously, the rendering system renders more accurate cubic Bezier splines using fewer computational resources than conventional systems. Additional detail regarding the rendering system 106 is provided below with respect to subsequent figures.

In addition, the environment 100 includes the server device 108. The server device 108 can generate, store, receive, and transmit any type of data, including graphical content and/or cubic Bezier splines. As shown, the server device 108 includes a content design server system 110 that communicates with the content design system 104 on the client device 102. For example, the content design server system 110 transmits graphical content to the client device 102, which enables the client device 102 to render and display a cubic Bezier spline. Notably, while only a single server device is shown, the content design server system 110 can be implemented across multiple server devices.

While not illustrated, in one or more embodiments, the server device 108 can include all, or a portion of, the rendering system 106, such as within the content design server system 110. For example, when located in the server device 108, the rendering system 106 can comprise an application running on the server device 108 or a portion of a software application that can be downloaded to the client device 102. For instance, the rendering system 106 includes a web hosting application that allows the client device 102 to interact with content from the content design server system 110 hosted at the server device 108. In this manner, the server device 108 can perform pre-processing of a cubic Bezier spline and enable the client device 102 to complete processing and/or display the cubic Bezier spline.

Although FIG. 1 illustrates a particular arrangement of the client device 102, server device 108, and network 112, various additional arrangements are possible. For example, the example environment 100 can include any number of client devices that implement the rendering system 106. As another example, the client device 102 can communicate directly with the server device 108, bypassing the network 114.

Figure 2:
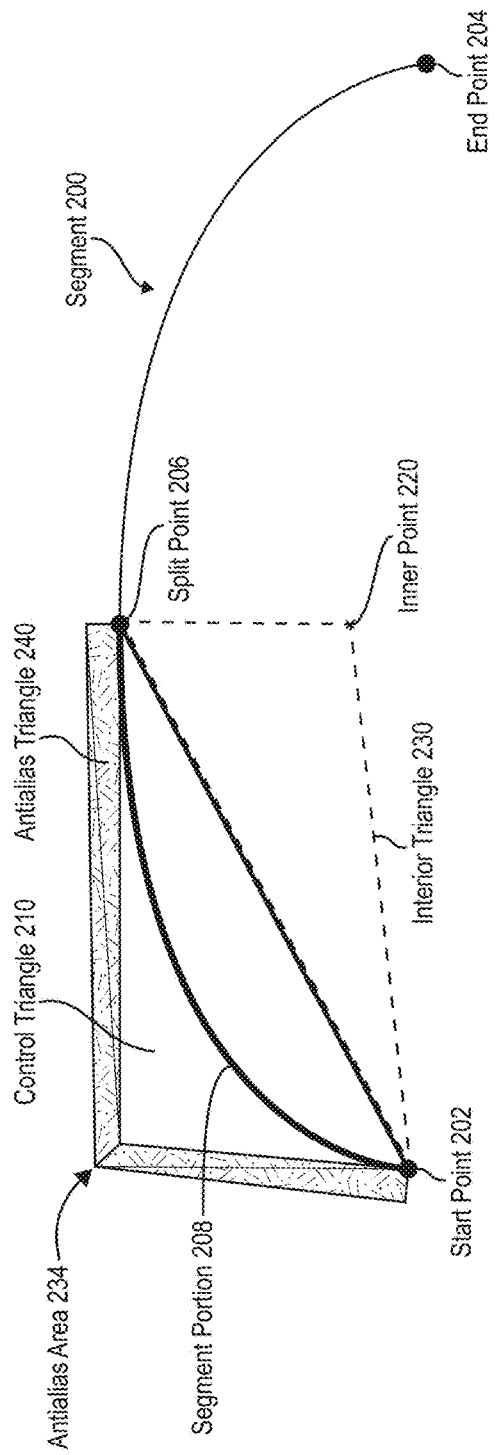
FIG. 2 illustrates a segment having a segment portion and corresponding control, interior, and anti-aliasing triangles in accordance with one or more embodiments.

Turning now to FIG. 2, an overview of the rendering system 106 rendering a cubic Bezier spline is described. In particular, FIG. 2 identifies various components that the rendering system 106 identifies, generates, and employs to render a segment portion of a cubic Bezier spline segment (or simply "segment"). While FIG. 2 provides an overview, additional detail regarding how the rendering system 106 identifies, generates, and renders the segment portion is provided below with respect to FIGS. 3A-5.

As shown, FIG. 2 illustrates a segment 200 of a cubic Bezier spline. The segment 200 can be joined to other cubic Bezier spline segments to form a composite Bezier spline and/or a vector-based object. The segment 200 includes a start point 202 and an end point 204 (e.g., base points), which represent base vertices of the segment. In addition, the segment 200 includes a split point at the maxima (e.g., apex) of the segment. Based on the start point 202 and the split point 206, the rendering system 106 identifies a segment portion 208 of the segment 200. Notably, the segment portion itself is monotonic, e.g., the segment portion does not contain an inflection point.

As also shown, the rendering system 106 generates a control triangle 210 based on the start point 202 and the split point 206. The control triangle 210 includes an interior side between the start point 202 and the split point 206, as well as two exterior sides (e.g., the adjacent sides). As shown in FIG. 2, one exterior side extends tangential to the segment portion at the start point 202, while the other exterior side extends tangential to the segment portion at the split point 206. The two exterior sides, therefore, intersect an intermediate point (i.e., a bisected point). Notably, the control triangle 210 encompasses the segment portion 208, meaning the segment portion 208 is contained within the control triangle 210. As will be explained further below, the containment of the segment portion 208 within the control triangle enables the GPU to render the segment portion 208 within the control triangle 210, as detailed below.

FIG. 2 also illustrates an interior triangle 230 below the segment portion 208 that shares the interior side of the control triangle 210. As shown, the rendering system 106 generates the interior triangle 230 by connecting the start point 202, split point 206, and inner point 220. By way of explanation, in many cases, the segment 200 can define the outside edge of an object or shape that is filled in with a given color, pattern, or texture. Accordingly, in these cases the interior of the segment 200 is filled in with the given color, pattern, or texture. As described below, the rendering system 106 employs the control triangle 210 and interior triangle 230 to seamlessly assign colors to pixels under the segment portion 208 for rendering of the segment portion.

FIG. 2 also shows anti-aliasing triangles 240 that create an anti-aliasing area 234 that forms a buffer around the exterior sides of the control triangle 210. In particular, in one or more embodiments, the anti-aliasing area 234 creates a uniform offset around the boundary of the segment portion. The rendering system 106 uses the anti-aliasing area 234 to assign a give color, or a shade of a given color to pixels on the outer edge of the segment portion to create an anti-aliasing affect that smoothes the appearance of the segment portion when the rendering system 106 ultimately renders the segment portion for display.

By way of illustration, parts of the segment portion 208 can overlap with the edge of the control triangle 210, particularly at the ends of the segment portion 208 (e.g., near start point 202 and split point 206). In some embodiments, while a portion of a pixel on the segment portion 208 is within the control triangle 210, the center of the pixel lies outside of the control triangle 210. As such, the rendering system 106 employs an anti-aliasing area 234 to ensure that those pixels are properly rendered. Additional detail regarding creating the anti-aliasing triangles 240 and the anti-aliasing area 234 is provided below.

Figure 3A:
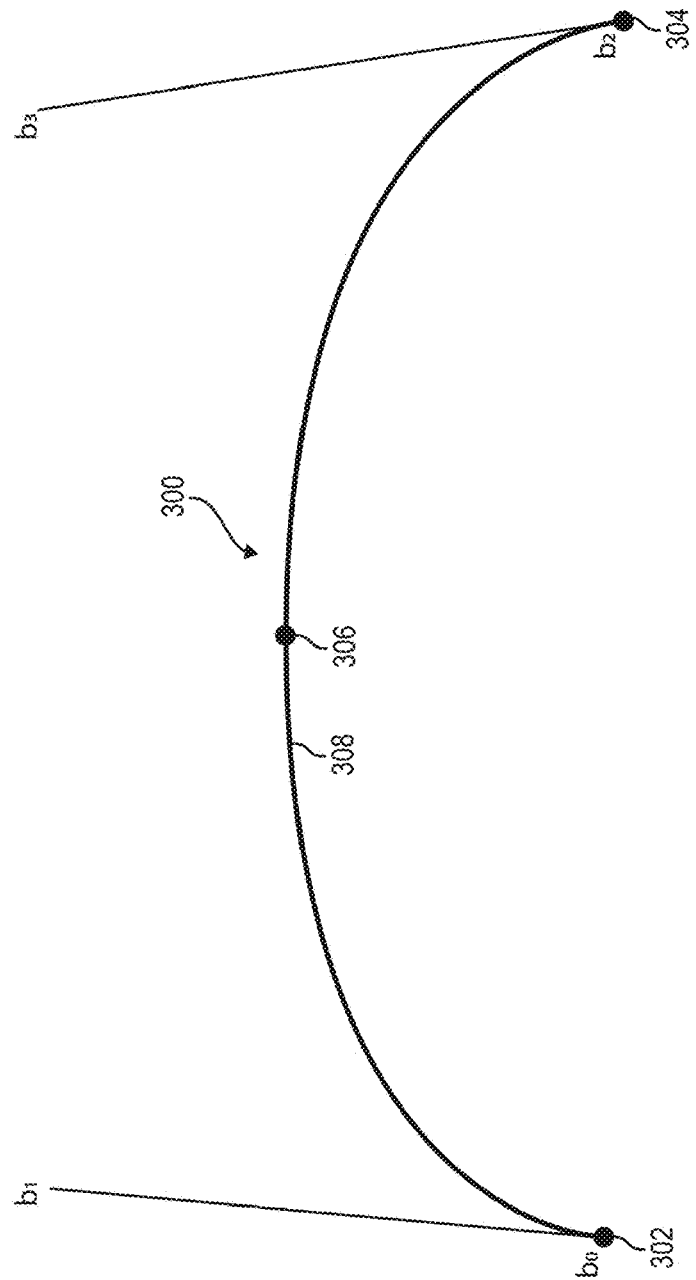
FIGS. 3A-3E illustrate generating control, interior, and anti-aliasing triangles for a segment portion in accordance with one or more embodiments.

Turning now to FIGS. 3A-3E, additional detail is now provided regarding the processes and operations the rendering system 106 employs to generate a control triangle, an interior triangle, and anti-aliasing triangles for a segment portion, which in turn enables the rendering system 106 to efficiently and accurately render the segment portion on a display of a computing device. FIG. 3A illustrates a segment 300 that comprises a cubic Bezier spline. As shown, the base points of the segment 300 include a start point 302 and an end point 304. In particular, the rendering system 106 identifies the start point 302 and the end point 304 at the base vertices of the segment 300.

In connection with identifying the start point 302 and the end point 304 of the segment 300, the rendering system 106 also identifies control points b0, b1, b2, and b3. In vector-based graphics, and as used herein, "control points" refer to a set of points that influence and define the shape of a Bezier spline. For example, a quadratic Bezier spline includes three control points while a cubic Bezier spline includes four control points. The rendering system 106 includes the control points b0, b1, b2, and b3 within a data representation of the segment 300.

In one or more embodiments, as part of rendering the segment 300, the rendering system 106 first simplifies segment 300 by creating a simplified data representation of the segment 300. In general, simplifying the segment 300, for example, includes dividing the segment 300 into two monotonic segment portions, and pre-processing the segment portions, as described further below. By spitting the segment 300 into monotonic segment portions, the rendering system 106 ensures that the segment lies completely within the control segment, which enables the rendering system 106 to efficiently and accurately generate a simplified data representation of each segment portion as well as generate other reference triangles (e.g., an interior and anti-aliasing triangles) for use in rendering cubic Bezier splines.

In various embodiments, the rendering system 106 performs simplification actions on the CPU of a computing device to generate the simplified data representation of the segment 300. Of note, pre-processing of the segment 300 on the CPU is not an approximation approach, which was described above with respect to conventional systems. In particular, after simplification, the data representation of segment 300 (or segment portions of segment 300) mathematically represent the original spline of the segment 300 (or segment portions of segment 300).

In one or more embodiments, as part of simplifying the segment 300, the rendering system 106 can categorize the shape of the segment 300. For example, the rendering system 106 categorizes the shape of the segment 300 as either a loop, cusp, or serpentine. In some embodiments, for instance, the rendering system 300 can employ a Loop-Blinn method to categorize the segment 300. To ensure monotonicity, if a segment is categorized as a loop (not shown), the rendering system 106 splits the segment 300 into two separate segments at the double point of the loop.

In addition, the rendering system 106 can determine segment information for the segment 300 to include in the simplified data representation of the segment 300. For example, as part of the segment information, the rendering system 106 computes rendering values for the segment 300, such as k, l, m values. In general, and as will be explained in detail below, the rendering system 106 utilize the rendering values to determine whether a pixel lies on, inside of, or outside of the segment 300 when rendering the segment 300. In some embodiments, the rendering system 106 stores the rendering information along with other segment information in a memory cache, such as in GPU memory to later be used for rendering, as described below.

As part of generating a data representation of the segment 300, the rendering system 106 can identify one or more segment portions of the segment 300. In particular, the rendering system 106 determines a split point 306 along the segment 300. In one or more embodiments, the rendering system 106 determines the split point 206 based on a maxima point, a minima point, or an inflection point of the segment 300. For example, as shown, the rendering system 106 determines the split point 306 at the maxima point of the segment 300. In alternative embodiments, the rendering system 106 can determine another point along the segment 300 as the split point (e.g., a half-way point).

As further shown in FIG. 3, based on the split point 306, the rendering system 106 determines a segment portion 308 between the split point 306 and the start point 302. Additionally, although not referenced in the figure, the rendering system 106 can determine an additional segment portion between the split point 306 and the end point 304. While FIGS. 3A-3E only describe rendering the segment portion 308, the rendering system 106 uses similar techniques, principles, and methods to render other segment portions having various different characteristics, shapes, and attributes.

Figure 3B:
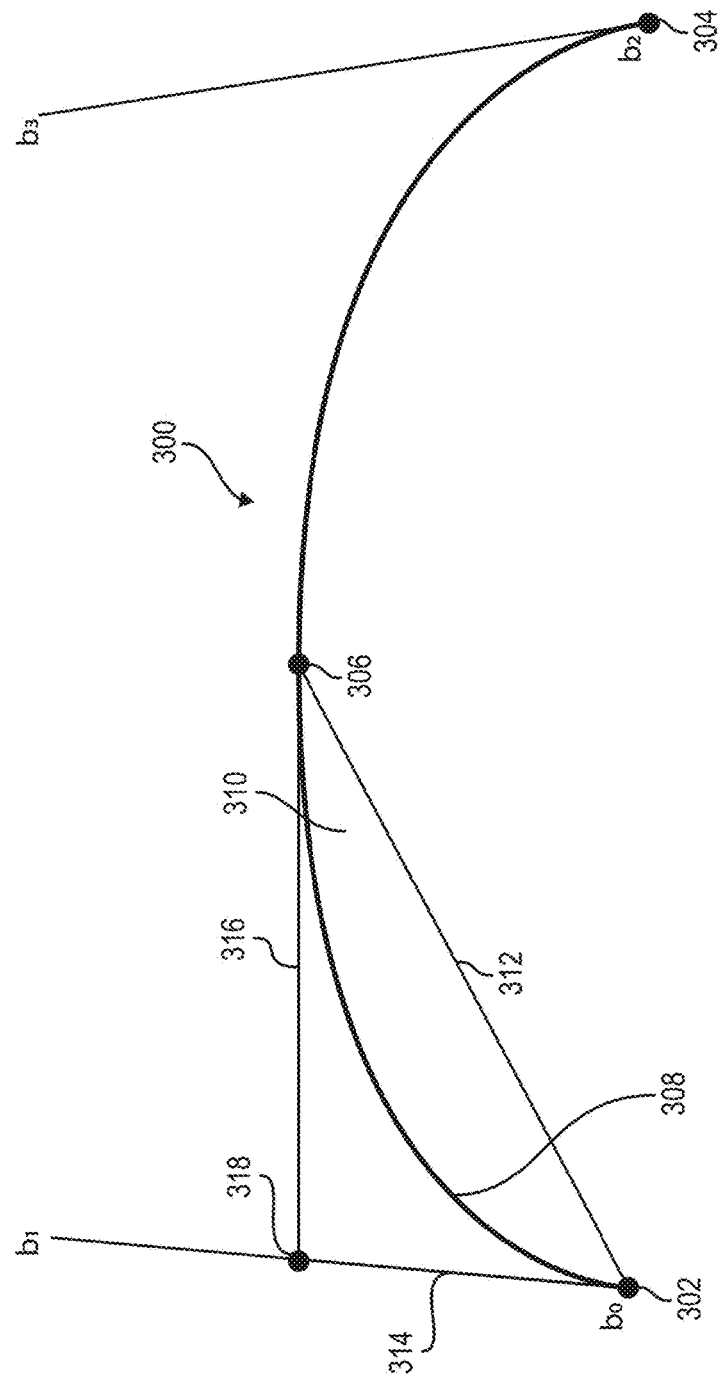

After identifying the segment portion 308, the rendering system generates additional information to include as simplified data representation of the segment 300 (e.g., segment portion 308). For example, FIG. 3B illustrates that the rendering system 106 generates a control triangle 310 that fully encompasses the segment portion 308. In particular, the rendering system 106 generates the control triangle 310 based on the start point 302, the split point 306, and a bisected point 318. As shown, the control triangle 310 includes an interior side 312 between the start point 302 and the split point 306.

Further, the control triangle 310 includes two exterior sides (i.e., adjacent sides). In particular, the control triangle 310 includes a start exterior side 314 between the start point 302 and the bisected point 318. In one or more embodiments, the start exterior side 314 is tangent to the segment portion 308 at the start point 302 and overlaps with the control line between the first control point b0 and the second control point b 1. In addition, the control triangle 310 includes a split exterior side 316 between the split point 306 and the bisected point 318. Similar to the start exterior side 314, the split exterior side 316 is tangent to the segment portion 308 at the split point 306.

Figure 3C:
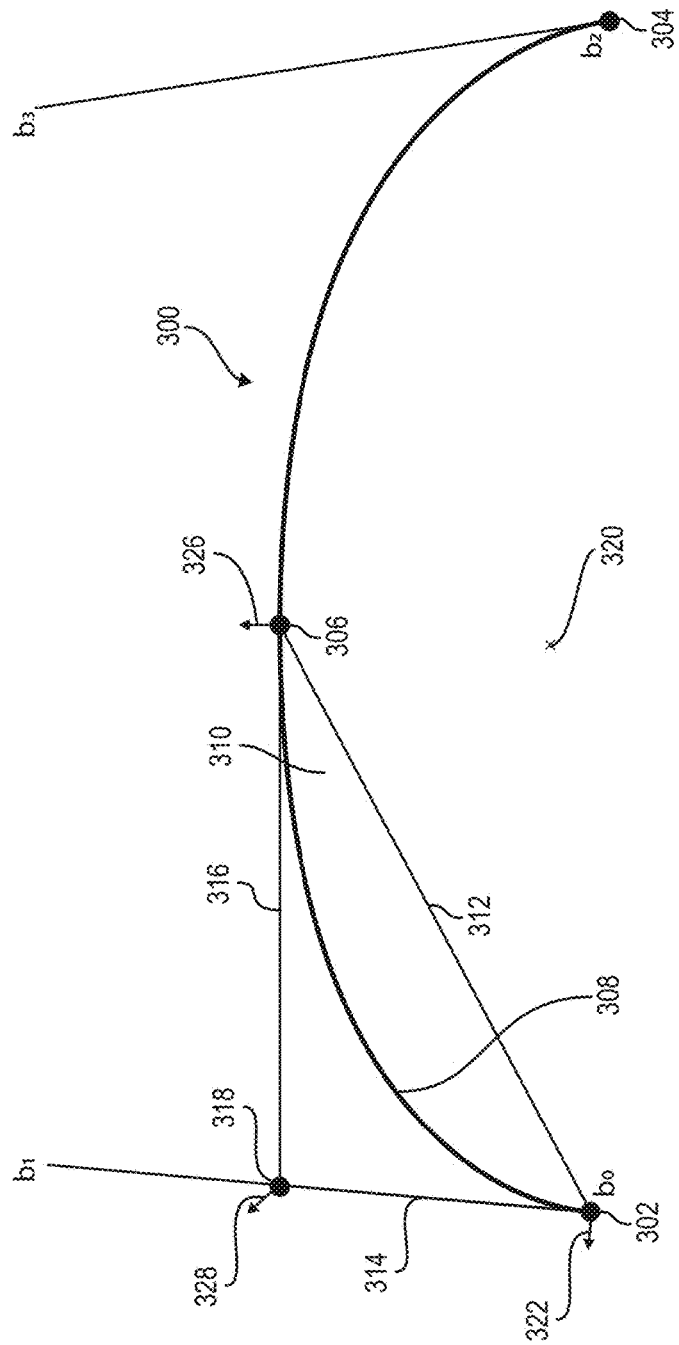

In addition to generating the control triangle 310, the rendering system 106 generates additional data to represent segment 300. For example, the rendering system can identify or determine an inner point and normal vectors associated with the segment 300. As shown, FIG. 3C illustrates an inner point 320, a start normal vector 322, a split normal vector 326, and a bisected normal vector 328 (collectively referred to as "normal vectors"). Regarding the inner point 320, FIG. 3C illustrates the rendering system 106 determines a location within the segment 300 as the inner point 320. Because the segment 300 is convex, the rendering system 106 selects an inner point that lies within the segment 300. In the illustrated embodiment, the rendering system 106 determines the inner point 320 as the center-of-mass point of the geometry bounded by cubic Bezier splines. In one or more embodiments, the center-of-mass of segment 300 is computed as the mean of the X, Y coordinate values of the based vertices of the control triangles corresponding to each segment portion of segment 300. In alternative embodiments, the rendering system 106 selects another point that is within the segment 300 (e.g., beneath the spline) as the inner point.

FIG. 3C also illustrates that the rendering system 106 creates normal vectors. As will be discussed below, the rendering system 106 can use the normal vectors to generate an anti-aliasing area. As shown, the rendering system 106 creates a start normal vector 322 that extends from the start point 302 and is orthogonal to the start exterior side 314 of the control triangle 310. In addition, the rendering system 106 creates a split normal vector 326 extending from the split point 306 and is orthogonal to the split exterior side 316. Moreover, the rendering system 106 creates a bisected normal vector 328 that extends from the bisected point 318, where the bisected normal vector 328 bisects the angle between the start exterior side 314 and the split exterior side 316, as shown.

Further, the rendering system 106 can use normal vectors that extend a short distance away from the segment portion 308. In one or more embodiments, the rendering system 106 extends each normal vector 1 or 2 pixels from corners of the control triangle 310 enclosing the segment portion 308. In alternative embodiments, the rendering system 106 extends each normal vector more than 2 pixels from corners of the control triangle 310 enclosing the segment portion 308.

In one or more embodiments, the rendering system 106 uses a CPU to pre-process the segment 300 to compute, identify, and generate the above described information to create segment information and data representative of the segment 300. In one or more embodiments, the rendering system causes the CPU to generate a data package that includes the data representation of the segment 300, and then transfer the data package to a GPU for further processing to render the segment 300. In one or more embodiments, the data representation of the segment 300 (or segment portion 308) includes vertex attributes, such as vertex coordinates, and the color of each vertex and each normal vector. The vertex attributes are passed to the GPU in a vertex buffer, while an index buffer is used to avoid replication of vertex data in the vertex buffer.

In addition, the data package can include control triangle attributes (e.g., primitive attributes), such as an index for accessing the data representation of the segment 300, the sign to compute K, L, M values for vertex of the control triangle and center of mass. The rendering system 106 can package the control triangle attributes for upload to a Uniform Buffer Object (UBO), and the UBO can be bound to a geometry shader of a graphics rendering pipeline of the GPU.

Moreover, the data package can include segment data, such as control points, and k, l, m values. In some embodiments, the control points of a segment are packed in a UBO (e.g., BasisBufferObject) that is bound to a fragment shader for use within an inversion process, as will be described further below. The k, l, m values are packed in another UBO (e.g., klmBufferObject) that is bound to the geometry shader. The k, l, m values are used to generate anti-aliasing triangles, as discussed below.

As mentioned above, the rendering system 106 can cause the CPU to transfer the data package containing the data representation of the segment 300 to the GPU for further processing. Additionally, or alternatively, the rendering system 106 stores the segment information within a memory cache. In this manner, the rendering system 106 can later retrieve the segment information using the GPU to generate interior triangles and anti-aliasing triangles. Notably, the GPU can reuse the same segment information and computations to generate interior triangles and anti-aliasing triangles for a segment portion for any resolution of the segment portion so long as the shape of the segment does not change. In addition, by employing the memory cache to store segment information, the rendering system 106 decreases data transfer between the CPU and the GPU on a computing device.

Figure 3D:
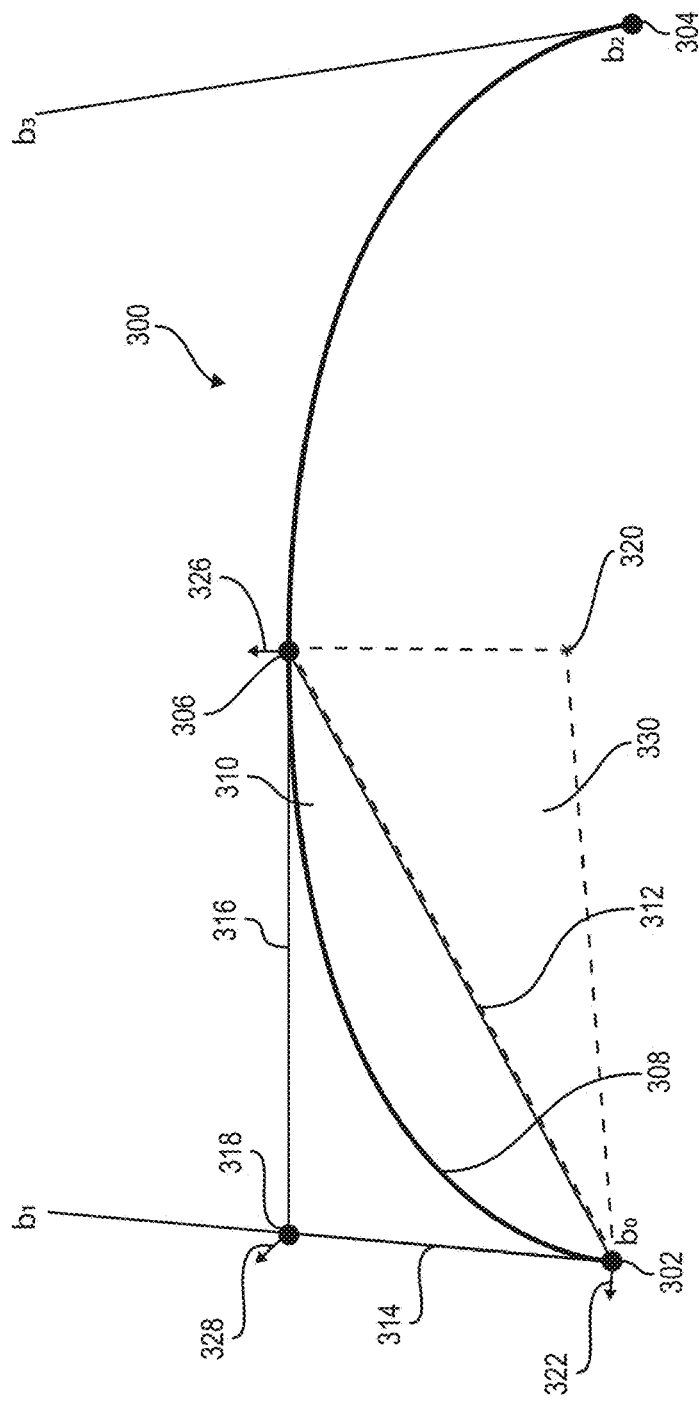

Upon the GPU receiving the segment information, or accessing segment information from a memory cache, the rendering system causes the GPU to generate reference triangles to be used in the rendering process of segment 300. For example, FIG. 3D shows the rendering system 106 generating an interior triangle 330 (depicted as dashed lines) by connecting the inner point 320 to the start point 302 and the split point 306. In this manner, this side of the interior triangle 330 overlaps (i.e., commonly shares) the interior side 312 of the control triangle 310. In addition, the rendering system 106 can set each pixel in the interior triangle to the given color or pattern of the segment portion 308.

As described above, in one or more embodiments, the rendering system 106 selects a center-of-mass point as the inner point 320. Using the center-of-mass point enables the rendering system 106 to generate interior triangles for each segment portion corresponding to the segment 300 (as the rendering system 106 can render multiple segment portions and segments in parallel). For example, the rendering system 106 generates the interior triangle 330 as well as an additional interior triangle (e.g., based on the inner point 320, split point 306, and end point 304) corresponding to an additional segment portion. Specifically, by employing interior triangles, the rendering system 106 improves the robustness of floating point GPU calculations, which improves the efficiency of the GPU (e.g., the geometry shader) when generating interior triangles for the segment 300.

Figure 3E:
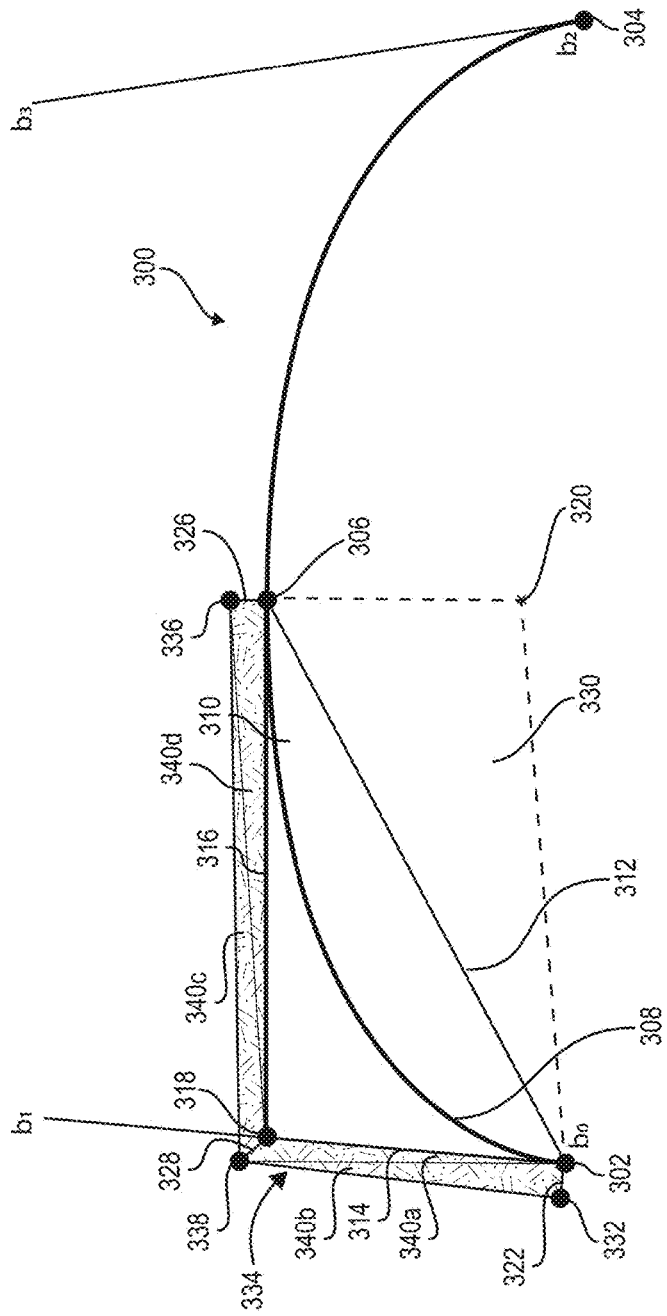

FIG. 3E illustrates that the rendering system 106 generates an anti-aliasing area 334 based on anti-aliasing triangles 340a-d (e.g., shown as triangles having spotted and lined texture). In particular, in one or more embodiments, the rendering system 106 determines vector points based on the normal vector from which to create the anti-aliasing area 334. For example, the rendering system 106 extends the start normal vector 322 from the start point 302 (e.g., 1-2 pixels) to a start vector point 332. Similarly, the rendering system 106 extends the split normal vector 326 from the split point 306 to a split vector point 336, and the bisected normal vector 328 from the bisected point 318 to a bisected vector point 338 the same distance as the start normal vector 322.

The distance the rendering system 106 extends the split normal vector 326, the bisected normal vector 328, and the start normal vector 322 can vary from one embodiment to the next based on a system default, a user setting, or segment attributes, for example. In any case, the extension distance is typically a small number of pixels, such as between one and six pixels.

Based on the normal vectors and vector points, the rendering system 106 can generate the anti-aliasing triangles 340a-d. To illustrate, FIG. 3E shows the rendering system 106 forms a first anti-aliasing triangle 340a and a second anti-aliasing triangle 340b based on the start normal vector 322 and the bisected normal vector 328. Similarly, FIG. 3E shows the rendering system 106 forms a third anti-aliasing triangle 340c and a fourth anti-aliasing triangle 340d based on the split normal vector 326 and the bisected normal vector 328.

As described above, the rendering system 106 uses anti-aliasing triangles 340a-d to generate the anti-aliasing area 334 within the GPU (e.g., geometry shader) because the GPU operates using triangles, but not polygons. Accordingly, while FIG. 3E shows a particular arrangement of anti-aliasing triangles 340a-d, the rendering system 106 can change the arrangement of the anti-aliasing triangles 340a-d. For example, the rendering system 106 generates the first anti-aliasing triangle 340a based on the start point 302, the start vector point 332, and the bisected point 318. In another example, the rendering system 106 fills in the anti-aliasing area 334 using a different number and/or combination of anti-aliasing triangles.

Upon determining the control triangle 310, interior triangle 330, and anti-aliasing triangles 340a-d, the rendering system 106 can render the segment portion 308. In one or more embodiments, the rendering system 106 renders (e.g., colors or fills in) each pixel in the interior triangle 330 to a given color, texture, or pattern. Alternatively, in some embodiments, the rendering system 106 individually colors each pixel in the interior triangle 330 using a mapping that indicates the color of each pixel.

In various embodiments, the rendering system 106 also renders pixels within the control triangle 310. In particular, for each pixel, the rendering system 106 determines whether the pixel lies on, inside, or outside of the segment portion 308. If the pixel lies on the segment portion 308, the rendering system 106 renders the pixel to the given color. Then, depending on whether the area below (or above) the segment portion 308 is filled in, the rendering system 106 renders pixels inside (or outside) to the given color.

In one or more embodiments, the rendering system 106 determines whether a pixel in a control triangle 310 lies on, inside, or outside of the segment portion 308 based on rendering values. In particular, the rendering system 106 uses k, l, and m values to determine a pixel's location relative to the segment portion 308. For example, the rendering system 106 determines that a pixel lies on or within the segment portion 308 when $k^3-lm<0$. Further, as described in connection with FIG. 4 below, when the pixel lies on the edge of the segment portion 308 and/or within a threshold distance to the segment portion 308 (e.g., within 2 pixels), the rendering system 106 can use the signed distance of the pixel (i.e., the distance between the pixel and the nearest point on the segment portion 308) to determine a fractional value (e.g., gradient level) at which to render the pixel.

In additional embodiments, the rendering system 106 can employ the anti-aliasing triangles 340a-d to render one or more pixels within the anti-aliasing triangles 340a-d. As mentioned above, anti-aliasing includes filling in pixels on the segment portion 308 that lie outside of the control triangle 310, but within the to one of the anti-aliasing triangles 340a-d and within the threshold distance to the segment portion 308. For example, for a pixel that lies in the anti-aliasing triangles 340a-d and is within 2 pixels of the segment portion 308, the rendering system 106 computes how far the pixel is from the boundary of the segment portion 308 so that the rendering system 106 can render the pixel to a fractional value based on the measured distance. Additional description regarding rendering pixels within the anti-aliasing triangles 340a-d is provided with respect to FIG. 5 below.

As mentioned above, the rendering system 106 employs a GPU to render the segment portion 308 including filling in pixels on, below, and above the segment portion 308. In particular, in one or more embodiments, the rendering system 106 employs the geometry shader of the GPU to generate interior triangles and anti-aliasing triangles. In some embodiments, as provided below in connection with FIG. 5, the rendering system 106 employs the geometry shader to perform additional operations in connection with anti-aliasing the segment portion 308. Then, the rendering system 106 employs the pixel shader (i.e., fragment shader) to fill in or color the pixels within control triangles, interior triangles, and anti-aliasing triangles.

While FIGS. 3A-3E illustrate the rendering system 106 generating a control triangle 310, interior triangle 330, and anti-aliasing triangles 340a-d for the segment portion 308, as mentioned above, the rendering system 106 can likewise determine corresponding triangles for one or more other portions of the segment 300. For example, for a segment having two portions, the rendering system 106 determines the above-described triangles in parallel. In this manner, the rendering system 106 further improves processing operations by efficiently by using the same segment information described above to render the entire segment at the same time. Further, in various embodiments, the rendering system 106 concurrently renders multiple segments of an object.

FIGS. 4A-4C illustrate example views of proper anti-aliasing rendering and poor anti-aliasing rendering of a cubic Bezier spline. As shown, FIG. 4A illustrates a segment 400 of a cubic Bezier spline, where the segment 400 is part of a filled-in object (see FIG. 4C). As FIG. 4B shows, the rendering system 106 generates a control triangle, interior triangle, and anti-aliasing triangles for each segment portion of segment 400, as described in detail above. For example, FIG. 4B illustrates that control triangles 410a-b include the first exterior side 414 of the first control triangle 410a, interior triangle 430a-b based on an inner point 420, and anti-aliasing triangles (not labeled for simplicity) making up anti-aliasing areas 434a-b. Using the various generated triangles, as previously described, the rendering system 106 renders the segment 400.

For example, FIG. 4C shows a first example 452 of proper anti-aliasing and a second example 454 of poor anti-aliasing for the segment 400. In the first example 452, the rendering system 106 can achieve proper anti-aliasing because each pixel on the portion of the segment corresponding to example 452 lies entirely within the control triangles 410a-b and antialiasing triangles 434a-b. Accordingly, the rendering system 106 can properly render each pixel in the first example 402 to achieve a smooth appearance that provides proper anti-aliasing based on employing the control and antialiasing triangles.

For example, and as shown in example 452, the rendering system 106 renders pixels on the segment to a given color, and renders pixels along the edge of the segment to fractional values based on the distance of the pixel to the segment 400. In particular, the rendering system 106 determines the signed distance between a pixel (e.g., a first pixel 456) and the segment 400. Based on the signed distance, the rendering system 106 applies a fractional value to the pixel which affects the alpha modulation levels (e.g., transparency) of the pixel during rendering. If the signed distance is beyond a threshold value, then the rendering system 106 can set the fractional value to zero (e.g., no rendering).

The rendering system 106 can employ various approaches to assign a fractional value. In some embodiments, the rendering system 106 employs a linear based approach. For example, on a scale of 0-2 pixels, if the first pixel 456 is over two pixels from the segment 400, the rendering system 106 sets the pixel to blank. If the first pixel 456 is 1 pixel away from the segment 400, the fractional value is set to 50% transparency of a given color. If the first pixel 456 is 0.5 pixels away from the segment 400, the fractional value is set to 25% transparency of the given color. In alternative embodiments, the rendering system 106 employs logarithmic, exponential, or other approaches to assign fractional color values to pixels.

In one or more embodiments, the rendering system 106 determines the signed distance of a pixel (e.g., the first pixel 456) from the center of the pixel to the nearest distance to the segment 400. Often, the nearest distance to the segment 400 will be tangent or near-tangent between the first pixel 456 and the segment 400. In some embodiments, as described below, the rendering system 106 compares the distance from a pixel to multiple locations on a segment to determine the shortest signed distance. Notably, unlike conventional systems which compute signed distances of quadratic Bezier splines, the rendering system 106 computes the signed distance from a cubic Bezier spline. In particular, the rendering system 106 converts a cubic Bezier spline (i.e., the segment 400) into implicit form. Then, while in implicit form, the rendering system 106 can accurately determine the signed distance between a pixel and the segment 400.

As shown in the second example 454, the portion of segment 400 within the second example 454 portion is rendered having poor anti-aliasing. In particular, poor anti-aliasing can occur when a cubic Bezier spline flattens out near of the end of the spline. In such as case, the center of pixels along the cubic Bezier spline (e.g., the segment 400) are often located outside, or partially located outside, of a control triangle, and as a result, the GPU cannot properly render the pixel because such pixels are not marked for rendering.

To illustrate, the second example 454 shown in FIG. 4C illustrates the first exterior side 414 of the first control triangle 410a as it relates to pixels in the second example 404. If the center of a pixel lies within the first control triangle 410a (i.e., to the right of the first exterior side 414), then the rendering system 106 renders the pixel. However, as described above, if the center of a pixel (e.g., a second pixel 458) lies outside of the first control triangle 410a, the rendering system 106 cannot render the pixel based on control triangles alone. Accordingly, the rendering system 106 employs anti-aliasing triangles to perform proper antialiasing near the end points of a segment, or when the segment overlaps with a side of a control triangle.

Figure 5:
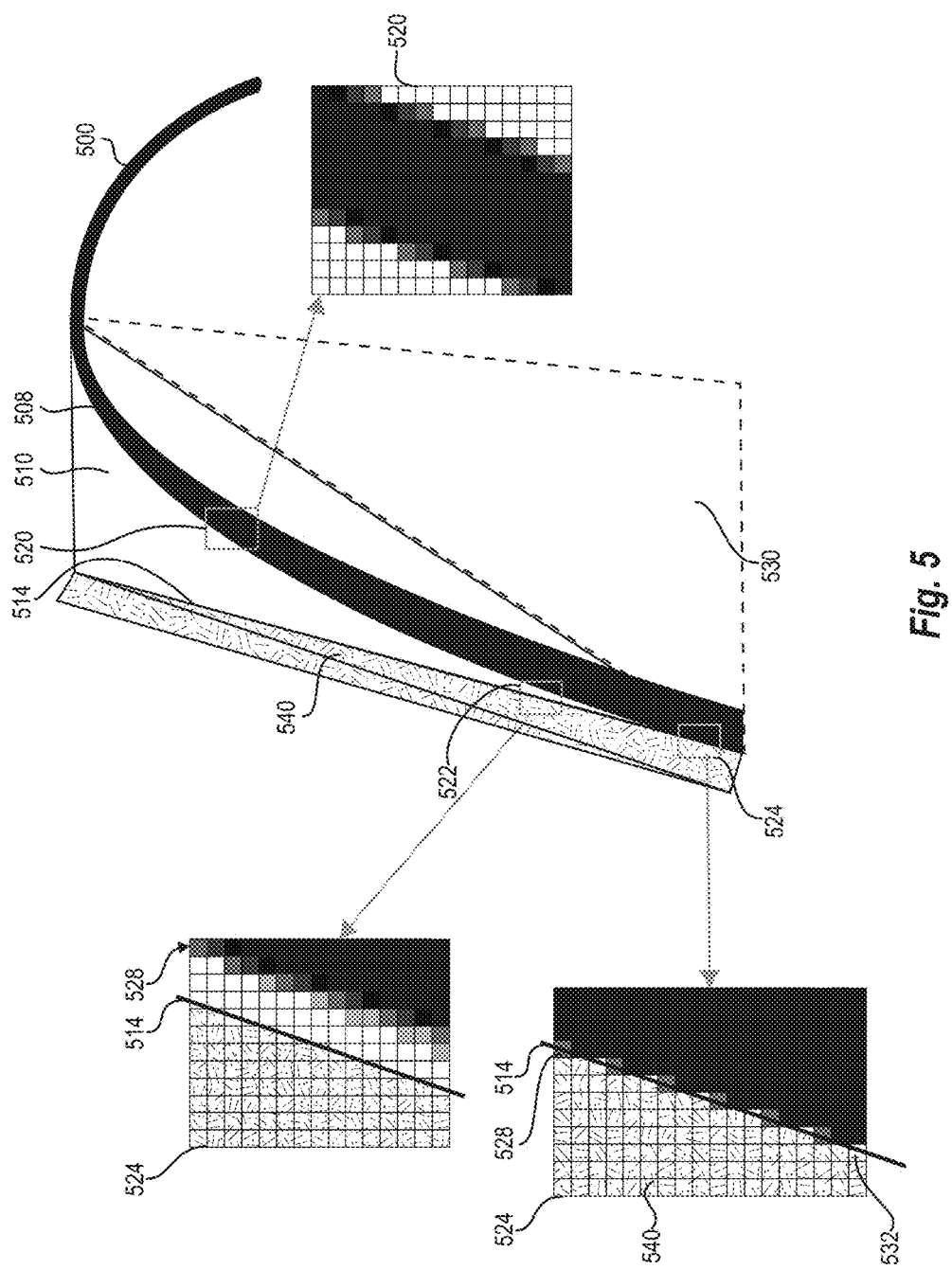
FIG. 5 illustrates employing anti-aliasing triangles to properly perform anti-aliasing on a segment of a cubic Bezier spline in accordance with one or more embodiments.

To illustrate, FIG. 5 shows the rendering system 106 employs anti-aliasing triangles to properly perform anti-aliasing on a segment of a cubic Bezier spline. As shown, the rendering system 106 identifies a monotonic segment portion 508 from a segment 500 of a cubic Bezier spline. Based on the segment portion 508, the rendering system 106 generates a control triangle 510, interior triangle 530, and anti-aliasing triangles to generate anti-aliasing area 540, as described above. FIG. 5 also illustrates a first example 520, a second example 522, and a third example 524 along various locations of the segment portion 508.

As shown in the first example 520, the rendering system 106 properly employs anti-aliasing to render the segment portion as a smooth cubic Bezier spline. In particular, the first example 520 illustrates the rendering system 106 rendering pixels along the edge of the segment portion 508 using fractional values to achieve a smooth appearance. As described above, when a pixel is entirely within a control triangle, the rendering system 106 properly renders the pixel without the use of anti-aliasing triangles.

The second example 522 illustrates a location on the segment portion 508 that is located closer to the edge of the control triangle 510. In particular, as shown, the second example 522 includes the first exterior side 514 of the control triangle 510 that separates the control triangle 510 and the anti-aliasing triangle 540. Notably, as shown in the second example 522, the gap between the segment portion 508 and the first exterior side 514 narrows from the top of the second example 522 to the bottom of the second example 522. Specifically, the curvature within the second example 522 is transitioning from rounder to flatter between the top of the second example 522 and the bottom of the second example 522, while the angle of the first exterior side 514/anti-aliasing triangle 540 remains constant.

The third example 524 shows a location on the segment portion 508 near the end of the segment 500 where the curvature is nearly flat. As shown, the first exterior side 514 of the control triangle 510 and the edge of the anti-aliasing triangle 540 overlap within the third example 524. For pixels within the control triangle 510, such as a first pixel 528, the rendering system 106 can properly render the pixels using a fractional value based on the pixel's distance (e.g., signed distance) to the segment portion 508. In addition, for certain pixels outside of the control triangle 510, such as a second pixel 532, the rendering system 106 can properly render the pixels using the anti-aliasing triangle 540 and the pixel's distance.

In one or more embodiments, even though the distance of a pixel is within a threshold distance (e.g., 1 or 2 pixels) of the segment portion 508, however, the pixel lies outside of the control triangle 510. In other words, even at the shortest distance between the pixel and the segment portion 308, the pixel is located outside of the control triangle 510 and within the anti-aliasing triangle 540. For example, the center of the second pixel 532 lies within a pixel of the segment portion 508 but is located to the right of the first exterior side 514 (outside of the control triangle 510). As a result, without the anti-aliasing triangle 540, the rendering system 106 cannot render the second pixel 532 even though it lies within the threshold distance to the segment portion 508. By using the anti-aliasing triangle 540, the rendering system 106 can enable the segment portion 508 shown in the third example 524 to appear similar to the anti-aliased portions shown in the first example 520 and second example 522. Specifically, the rendering system 106 fractionally renders a number of pixels within the anti-aliasing triangle 540 that lie within the threshold distance to the segment portion 508.

In one or more embodiments, such as in the above-mentioned embodiments, the rendering system 106 can use cubic Bezier inversion (or simply "inversion") to determine whether a pixel lies within a control triangle. For example, the rendering system 106 uses the x and y values of the pixel in the plane to find a t-value corresponding to the pixel. If the t-value is between 0 and 1 (i.e., [0, 1]), then the pixel lies within the control triangle. Otherwise, the pixel lies outside of the control triangle. Generally, the values of [0, 1] can represent the span of the segment 500 within the enclosing triangle of the segment 500. Specifically, the start point of the segment is 0, and the end point is 1 in an x, y plane. In addition, the control triangles encompass the segment 500 from the start point (e.g., 0) to the end point (e.g., 1). Rather than using [0, 1], the rendering system 106 can employ a different bounded number range (e.g., [0, 10], [−1, 1], or [−1, 0]).

Listing 1 below provides example pseudocode of a cubic Bezier inversion operation that the rendering system 106 can employ to identify the t-value of a point (e.g., pixel) along a cubic Bezier spline. Notably, the rendering system 106 optimizes the inversion method shown in Listing 1 by transforming the control points such that the nearest pixel lies on the origin of the transformed coordinate space. Thus, given the nearest point and control points of a segment (e.g., segment 500) in the correct coordinate space (i.e., Cartesian space), Listing 1 computes the parametric value 't' at nearest point as follows:

```
#define CUBIC_IMPLICIT_INVERSION\
vec2 b0n=cp0−nearestPoint; \n" \
vec2 b in =cp1−nearestPoint; \n" \
vec2 b2n=cp2−nearestPoint; \n" \
vec2 b3n=cp3−nearestPoint; \n" \
float 131n=C33*C31*determinant(b3n, b1n); \n" \
float 130n=C33*C30*determinant(b3n, b0n); \n" \
float 121n=C32*C31*determinant(b2n, b1n); \n" \
float 120n=C32*C30*determinant(b2n, b0n); \n" \
float 110n=C31*C30*determinant(b1n, b0n); \n" \
float c0=3*determinant3(b1n, b2n, b3n); \n" \
float c1=determinant3(b0n, b1n, b3n); \n" \
float c2=−determinant3(b0n, b2n, b3n); \n" \
float 1a=c1*131n+c2*(130n+121n)+c0*120n; \n" \
float 1b=c1*130n+c2*120n+c0*110n; \n" \
float t=1b/(1b−1a); \n"
```

Listing 1

As shown in Listing 1, the CUBIC_IMPLICIT_INVERSION includes computing the t-value of a point when a cubic Bezier spline is represented in implicit form. For example, Listing 1 includes vectors b0-b3 that are defined by determining the distance between a corresponding control point (e.g., cp1-cp3) and the nearest point. Notably, the rendering system 106 uses control points of a segment (e.g., segment 500) of the monotonic cubic Bezier spline (see FIG. 3A) rather than from just the segment portion 508. As described above, the control points of a segment are included in segment information and stored in memory, such as a uniform buffer object (UBO) in a memory cache. In some embodiments, the index into the UBO is output as one or more attributes by the geometry shader of the GPU. Also, the rendering system 106 can pass a mapping matrix to the pixel shader to convert Bezier control points to screen coordinate space. In addition, Listing 1 includes multiple floating-point calculations used to find the t-value of the point based on vectors, constraints, and matrices associated with the point and the segment, as is common in the art.

As mentioned above, if the t-value of a pixel is within the bounded range (e.g., [0, 1]), then the pixel is within a control triangle, and the rendering system 106 renders the pixel based on its signed distance (e.g., applies alpha modulation). If the t-value of the pixel is outside of the bounded range, the rendering system 106 can apply quadratic approximation (described below) to render the pixel. By using a quadratic approximation, the rendering system 106 ensures that a pixel will lie within a bounded range of one of the approximated quadratic Bezier splines. Specifically, the shortest distance between the point and one of the two quadratic segments will be within the bounded range, given the anti-aliasing triangles. For instance, unlike cubic Bezier splines, quadratic Bezier splines do not include inflection points. Accordingly, by employing quadratic segments, the rendering system 106 ensures that there is no possibility of a spline looping back into an anti-aliasing triangle.

To further explain, the rendering system 106 generates control triangles to exclude minima points, maxima points, and inflection points. However, because anti-aliasing triangles effectively expanded the area of the control triangles, there is no guarantee that the anti-aliasing triangles are free from inflection points. In rare and special cases, an inflection point of the cubic Bezier spline falls near the spline and causes the spline to loop back within the area of an anti-aliasing triangle. Thus, the signed distance determined above for a pixel outside a control triangle (i.e., in an anti-aliasing triangle) can incorrectly relate to the spline crossing through the anti-aliasing triangle rather than the segment portion 508. For these special cases, the rendering system 106 can employ quadratic approximation to verify that the signed distance is between the pixel and the segment portion 508 within the control triangle 510.

As an example, the rendering system 106 approximates the segment portion 508 into two quadratic segments (e.g., quadratic Bezier splines) using the geometry shader on the GPU. In one or more embodiments, the rendering system 106 separates the segment portion 508 at a midpoint (e.g., halfway between a start point and a split point). In alternative embodiments, the rendering system 106 divides the segment portion 508 at a different point (e.g., before or after the midpoint). In some embodiments, the rendering system 106 generates five control points to form the two quadratic segments. The rendering system 106 passes the x, y coordinates for these points to the pixel shader as a flat attribute, which are then used to perform anti-aliasing, as described below.

Upon dividing the segment portion 508 into two quadratic segments, the rendering system 106 determines a new distance (e.g., signed distance) between the pixel and each of the quadratic segments. Using the shortest new distance as the signed distance, the rendering system 106 renders the pixel. Specifically, the rendering system 106 employs the pixel shader of the GPU to render the pixel within the anti-aliasing triangle 540 to a fractional value, where the fractional value is based on the pixel's distance to the closest quadratic segment.

The number of cases where the rendering system 106 employs quadratic approximation is very small. However, to ensure robust results, the rendering system 106 can perform in these cases to ensure a smooth cubic Bezier spline. Further, because the rendering system 106 performs quadratic approximation in connection with anti-aliasing triangles, which are generally 1-2 pixels in height, and because the rendering system 106 only approximates two quadratic segments, the number of computations are trivial.

Thus, unlike conventional systems, the rendering system 106 can perform a quadratic approximation using the GPU at runtime, which enables the rendering system 106 to perform anti-aliasing on the spline with only minor additional computations. More importantly, by employing the GPU to perform a quadratic approximation rather than the CPU (which would introduce inaccuracies to the spline), the rendering system 106 prevents fundamental changes to the geometry of the cubic Bezier spline. Rather, the rendering system 106 uses anti-aliasing to enhance the smoothness of the cubic Bezier spline.

Figure 6:
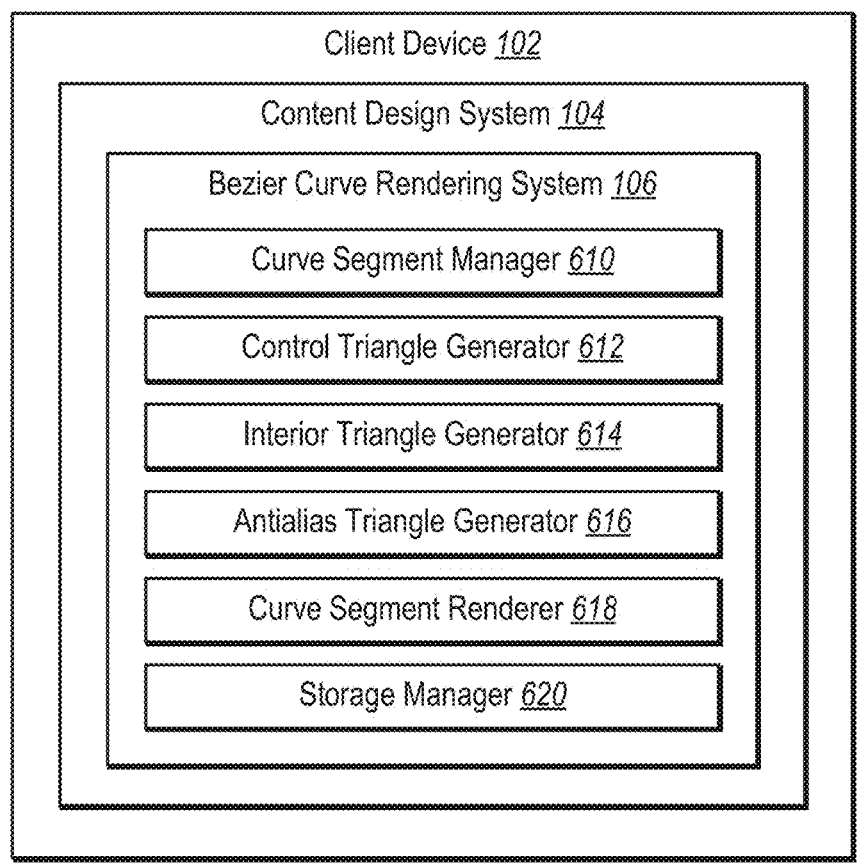
FIG. 6 illustrates a schematic diagram of the rendering system in accordance with one or more embodiments.

Turning now to FIG. 6, additional detail will be provided regarding capabilities and components of the rendering system 106 in accordance with one or more embodiments. In particular, FIG. 6 shows a schematic diagram of the rendering system 106, the client device 102, and the content design system 104 described above in relation to FIG. 1. As mentioned in relation to FIG. 1, in one or more embodiments, some or all of the components of the rendering system 106 can be implemented separately from the content design system 104 and the client device 102.

As shown, the rendering system 106 in FIG. 6 includes a spline segment manager 610, a control triangle generator 612, an interior triangle generator 614, an anti-aliasing triangle generator 616, and a spline segment renderer 618, and storage manager 620. In addition, the rendering system 106 includes a storage manager 620 that maintains vector-based objects and segment information for cubic Bezier splines.

In one or more embodiments, the CPU of the client device 102 implements the spline segment manager 610 and the control triangle generator 612 to pre-process a segment portion and/or segment (e.g., cubic Bezier spline). In addition, the CPU stores segment information in memory via the storage manager 620. The GPU of the client device 102 accesses the memory via the storage manager 620 and renders the segment portion and/or segment using the interior triangle generator 614, the anti-aliasing triangle generator 616, and the spline segment renderer 618. In some embodiments, the geometry shader of the GPU implements the interior triangle generator 614, the anti-aliasing triangle generator 616 and the pixel shader (i.e., fragment shader) of the GPU implements the spline segment renderer 618.

As mentioned, and as shown in FIG. 6, the rendering system 106 includes the spline segment manager 610. The spline segment manager 610 can obtain, receive, identify, determine, and/or store one or more segment portions of a cubic Bezier spline. For example, the spline segment manager 610 manages vector-based objects within a digital document that includes one or more cubic Bezier splines. For at least one of the cubic Bezier splines, the spline segment manager 610 classifies the spline as either a loop, cusp, or serpentine. In addition, for at least one of the cubic Bezier splines, the spline segment manager 610 can determine a monotonic segment portion from the spline. As described above, a monotonic segment portion does not include a maximum point, a minimum point, or an inflection point.

In one or more embodiments, the spline segment manager 610 determines rendering values for a segment. In particular, the spline segment manager 610 can determine k, l, and m values for the segment. Further, in one or more embodiments, the spline segment manager 610 identifies, determines, calculates, computes, and/or locates an inner point (e.g., center-of-mass point) for a segment portion, as previously described.

In addition, the spline segment manager 610 can store segment information for a segment (i.e., a cubic Bezier spline) and a segment portion of the segment in memory via the storage manager 602. For example, the spline segment manager 610 stores vertex coordinates, control points, rendering values, one or more inner points, attributes, colors, and/or textures of the segment in memory storage (e.g., a memory cache or memory buffer). Additional examples of memory storage include a uniform buffer object (UBO), a vertex buffer, a basis buffer object, and an index buffer.

As shown, the rendering system 106 includes the control triangle generator 612. In general, the control triangle generator 612 determines, generates, computes, estimates, and/or calculates one or more control triangles for a segment of a cubic Bezier spline. For example, the control triangle generator 612 generates a control triangle for each segment portion of a segment. As described above, a control triangle fully encloses the segment portion of a segment.

The control triangle generator 612 can generate a control triangle that includes an interior side and two exterior sides. In particular, the control triangle generator 612 generates an interior side that connects a base point (e.g., start point or end point) to a split point within the segment portion. If the segment includes a maximum point, the interior side of the control triangle lies under the segment portion. Otherwise, if the segment portion includes a minimum point, the interior side of the control triangle lies above the segment portion. The exterior sides of a control triangle are tangent to the base point and split point and meet at a bisected point.

In some embodiments, the control triangle generator 612 can also determine normal vectors for a segment portion. In particular, the control triangle generator 612 generates normal vectors that extend from each vertex of a control triangle, as described above. For example, the control triangle generator 612 generates a start normal vector, a bisected normal vector, a split normal vector, and/or an end point normal vector In addition, the control triangle generator 612 can store segment information about control triangles via the storage manager 620. For example, the control triangle generator 612 stores the vertices and coordinates of control triangles for a segment in connection with the stored segment information. In addition, the control triangle generator 612 stores information regarding the generated normal vectors described above.

As shown, the rendering system 106 also includes the interior triangle generator 614. In general, the interior triangle generator 614 determines, generates, computes, estimates, and/or calculates one or more interior triangles for a segment of a cubic Bezier spline. For example, the interior triangle generator 614 generates an interior triangle for each segment portion based on the inner point of a segment, as described above.

In addition, the rendering system 106 includes the anti-aliasing triangle generator 616. In one or more embodiments, the anti-aliasing triangle generator 616 determines, generates, computes, estimates, and/or calculates anti-aliasing triangles for a segment of a cubic Bezier spline. For example, the anti-aliasing triangle generator 616 generates multiple anti-aliasing triangles for a segment portion. The anti-aliasing triangle generator 616 generates anti-aliasing triangles based on the normal vectors, as described above.

As shown in FIG. 6, the rendering system 106 also includes the spline segment renderer 618. In general, the spline segment renderer 618 marks, fills in, textures, and/or colors pixels on a segment portion of a segment. For example, the spline segment renderer 618 uses control triangles, interior triangles, and anti-aliasing triangles to render a segment portion. In one or more embodiments, the spline segment renderer 618 renders pixels according to fractional values that are based on each pixel's distance (e.g., signed distance) to the segment portion.

In some embodiments, the spline segment renderer 618 performs quadratic approximation in connection with the anti-aliasing triangles to add additional pixels to the segment portion, which gives the segment portion a smooth appearance. For example, as described above, the spline segment renderer 618 divides a segment portion into two quadratic Bezier splines. Further, the spline segment renderer 618 uses the quadratic Bezier splines to properly apply anti-aliasing to the segment portion, as previously provided.

As shown, the rendering system 106 includes a storage manager 620. In general, the storage manager 620 maintains, stores, organizes, and/or retrieves data associated with the rendering system 106. For example, the storage manager 620 maintains segment information for a segment portion and/or a segment, as described above. Further, the storage manager 620 communicates with other components of the rendering system 106 to facilitate storing and accessing cubic Bezier spline information.

The components 610-620 of the rendering system 106 can include software, hardware, or both. For example, the components 610-620 can include one or more instructions stored on a computer-readable storage medium and executable by processors of one or more computing devices, such as a client device or server device. When executed by the one or more processors, the computer-executable instructions of the rendering system 106 can cause the computing device(s) to perform the feature learning methods described herein. Alternatively, the components 610-620 can include hardware, such as a special-purpose processing device to perform a certain function or group of functions. Alternatively, the components 610-620 of the rendering system 106 can include a combination of computer-executable instructions and hardware.

Furthermore, the components 610-620 of the rendering system 106 can, for example, be implemented as one or more operating systems, as one or more stand-alone applications, as one or more modules of an application, as one or more plug-ins, as one or more library functions or functions that can be called by other applications, and/or as a cloud-computing model. Thus, the components 610-620 can be implemented as a stand-alone application, such as a desktop or mobile application. Furthermore, the components 610-620 can be implemented as one or more web-based applications hosted on a remote server. The components 610-620 can also be implemented in a suite of mobile device applications or "apps." To illustrate, the components 610-620 can be implemented in an application, including but not limited to ADOBE® ILLUSTRATOR®, ADOBE PHOTOSHOP®, ADOBE® CREATIVE CLOUD® software. "ADOBE," "ILLUSTRATOR," "PHOTOSHOP," and "CREATIVE CLOUD" are either registered trademarks or trademarks of Adobe Systems Incorporated in the United States and/or other countries.

Figure 7:
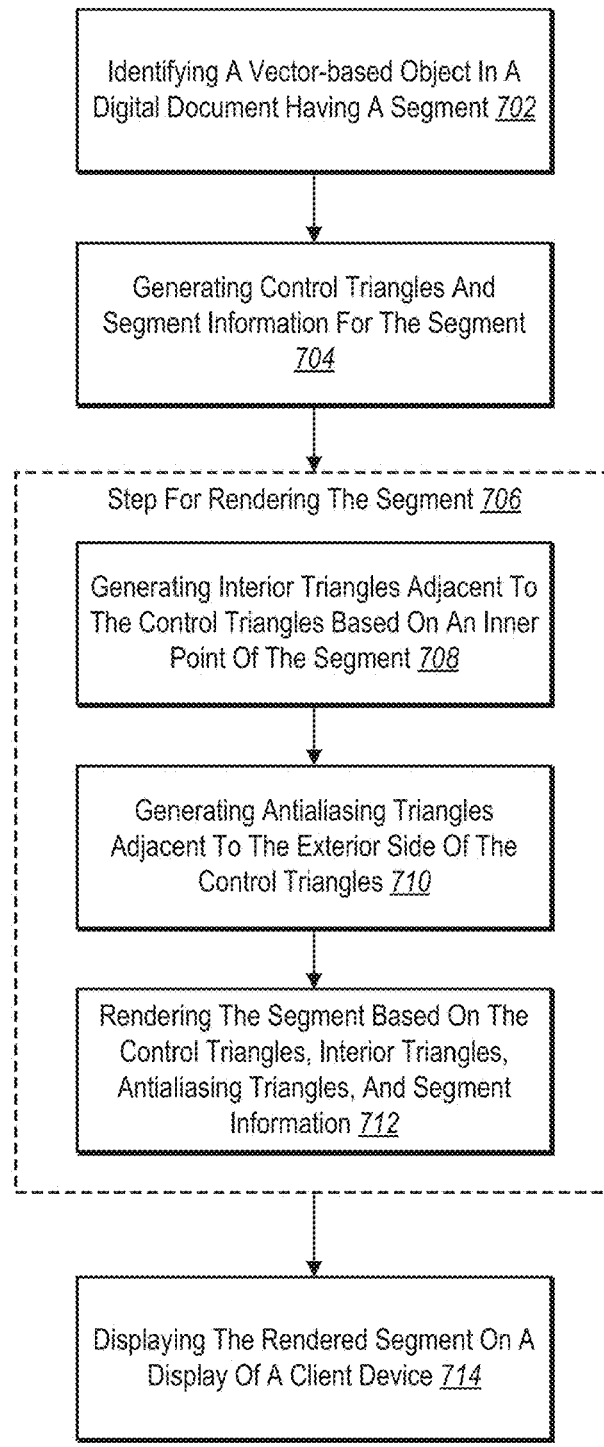
FIG. 7 illustrates acts in a step for rendering the segment on a display of a computing device in accordance with one or more embodiments.

FIG. 7 illustrates a flow diagram of performing a step for rendering the segment on a display of a computing device in accordance with one or more embodiments. As illustrated, FIG. 7 includes acts 702-714 to render a segment of a vector-based object. In particular, as described below, the acts 708-712 make up a step 706 for rendering the segment on a display of a computing device based on the control triangles, generated interior triangles, and generated anti-aliasing triangles.

As shown, the rendering system 106 performs an act 702 of identifying a vector-based object in a digital document having a segment. For example, the rendering system 106 identifies one or more objects in a digital document that are made up of vectors and have at least one cubic Bezier spline. For one or more of the identified objects, the rendering system 106 identifies the cubic Bezier spline (i.e., segment). In some embodiments, the rendering system 106 further identifies multiple segment portions from the segment. For instance, as described above, the rendering system 106 determines two segment portions that are monotonic cubic Bezier segments.

In addition, the rendering system 106 performs the act 704 of generating control triangles and segment information for the segment. For example, the rendering system 106 generates a control triangle for each segment portion of the segment as described above. In particular, the rendering system 106 generates control triangles having an interior side connecting a base point (e.g., a start point or end point) to a split point. In addition, the control triangle has two exterior sides that each connect the base point and the split point to a bisected point. In this manner, the rendering system 106 generates control triangles that encompass each segment portion of the segment.

Further, in one or more embodiments, the rendering system 106 determines segment information for the segment, such as an inner point (e.g., center-of-mass point) of the segment. As previously described, the rendering system 106 can store the control triangle info and segment information for the segment in a memory cache. In addition, in some embodiments, the rendering system 106 employs a CPU to generate the control triangles and segment information, as provided above.

The rendering system 106 also performs a step 706 for rendering the segment. In particular, the step 706 includes an act 708 of generating interior triangles adjacent to the control triangles based on an inner point of the segment. For example, the rendering system 106 builds interior triangles based on the interior side of each control triangle. Specifically, the rendering system 106 generates an interior triangle that connects a base point (e.g., a start point or end point) of the segment with a split point and the inner point, as described above.

The step 706 also includes an act 710 of generating anti-aliasing triangles adjacent to the exterior sides of the control triangle. As described above, the rendering system 106 generates anti-aliasing triangles that extend the area of the control triangles for the purpose of smoothing a cubic Bezier spline via anti-aliasing. In some embodiments, the rendering system 106 employs normal vectors extending from the control triangles to generate an anti-aliasing area that includes the anti-aliasing triangles.

In one or more embodiments, the rendering system 106 performs quadratic approximation in connection with generating the anti-aliasing triangles and/or rendering the segment. For example, as described above, the rendering system 106 uses quadratic approximation to ensure that the signed distance between a point (e.g., pixel) and the segment is proper.

In addition, the step 706 includes an act 712 of rendering the segment based on the control triangles, interior triangles, anti-aliasing triangles, and segment information. For example, the rendering system 106 employs the rendering values from the segment information to render one or more pixels on and within (or outside of) the segment within the control triangles, as described above. As also described above, the rendering system 106 renders each pixel within the interior triangles. Further, as described above, the rendering system 106 employs the anti-aliasing triangles to render one or more pixels within the anti-aliasing triangles to a fractional value of the given color of the segment.

In some embodiments, the rendering system 106 performs the step 706 of rendering the segment within the GPU of a computing device. For example, the rendering system 106 employs a geometry shader within the GPU to generate interior triangles and anti-aliasing triangles. Further, the rendering system 106 employs the geometry shader to perform a quadratic approximation when needed. In another example, the rendering system 106 employs a pixel shader within the GPU to fill in/color each pixel on the segment.

As shown, the rendering system 106 performs an act 714 of displaying the rendered segment on a display of a client device. In particular, the rendering system 106 passes the rendered segment to a frame buffer, which displays the rendered segment on a client device's display. Further, the rendering system 106 displays additional rendered segments of the vector-based object on the display.

To evaluate the effectiveness of one or more embodiments, evaluators compared the above-disclosed techniques to standardized CPU-based tessellation techniques (i.e., converting cubic Bezier to quadratic Bezier on CPUs, and then rendering quadratic Beziers on the GPUs). In particular, the evaluators used the same computing device for each test. For reference, the computing device had the following hardware: a 3.5 GHz 6-Core Intel Xeon E5 processor, 16 GB 1866 MHz DDR3 ECC memory, and dual AMD FirePro D500 video processor (each with 3 GB VRAM). In addition, the computing device used a MACINTOSH® Operating System along with the same ABODE® ILLUSTRATOR® computer application to render the vector-based files.

Figure 8B:
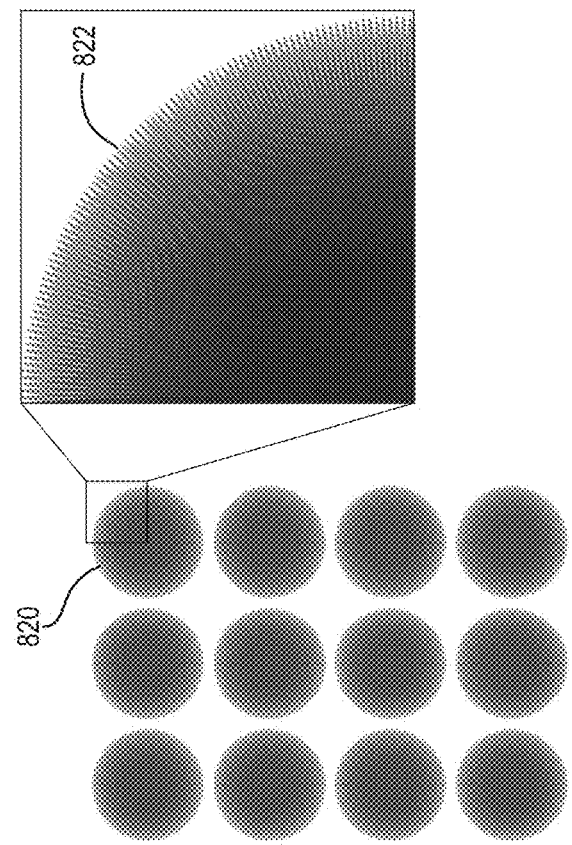
FIGS. 8A and 8B illustrate example rendering results of vector-based objects in accordance with one or more embodiments.
Figure 8A:
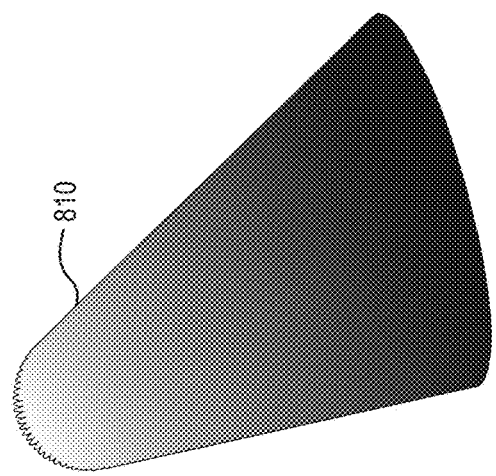

The evaluators rendered three different vector-based object files, namely, a blend object file (i.e., "Blend.ai"), a first ellipses object file (i.e., "Ellipses.ai"), and a second ellipses object file (i.e., "Ellipses2.ai"). For reference, FIG. 8A illustrates a representation of the blended object 810 used in the blend object file (note the original object included a color gradient). FIG. 8B illustrates a representation of the spherical objects 820 used in the first ellipses file. Notably, the first ellipses object file used in testing included 90 separate spherical objects 820 rather than the 12 shown in FIG. 8B. Each spherical object is made up of approximately 360 ellipsis that overlap at different points of a spherical object, creating a gradient effect. For example, ellipse 822 is one of the ellipses that make up a spherical object.

As mentioned above, FIGS. 8A and 8B are for illustrated purposes and include only a representation of the objects used in testing. For instance, the objects illustrated in FIGS. 8A and 8B have been considerably reduced in size.

The following tables highlights the performance improvements obtained with the techniques disclosed herein over standard CPU based tessellation techniques, as noted above.

| First Frame Draw Time (without Cache): | | | |
|---|---|---|---|
| File | Prior Techniques | Disclosed Techniques | Gain |
| Blend.ai | 297.854 ms | 73.561 ms | 4.049074917 |
| Ellipses.ai | 108.902 ms | 40.5122 ms | 2.688128514 |
| Ellipses2.ai | 49.4146 ms | 21.3659 ms | 2.328762186 |

Frame Redraw Time (with Cache):

| File | Prior Techniques | Disclosed Techniques | Gain |
|---|---|---|---|
| Blend.ai | 49.3171 ms | 29.2195 ms | 1.687814644 |
| Ellipses.ai | 20.0976 ms | 19.6585 ms | 1.022336394 |
| Ellipses2.ai | 16.6098 ms | 15.9756 ms | 1.03969804 |

Memory Usage:

| File | Prior Techniques | Disclosed Techniques | Memory Reduction |
|---|---|---|---|
| Blend.ai | 74,499 kB | 33,807 kB | 2.203656048 |
| Ellipses.ai | 71,277.2 kB | 16,659.8 kB | 4.278394699 |
| Ellipses2.ai | 23,346.6 kB | 16,257 kB | 1.436095221 |

In the above tables, the first test evaluated the time (in millisecond) for a first frame draw without the cache. As shown, the disclosed herein performed significantly better with respect to each of the vector-based object files. In particular, the disclosed techniques performed at least twice as fast, and with the blend object file (see FIG. 8A), over four times faster. Similarly, in the second test, which evaluated the time (in millisecond) for a frame redraw with cache, the disclosed techniques rendered each of the vector-based object files faster than by using conventional techniques.

The third test evaluated memory usage advantages (in kilobytes) between the disclosed techniques and conventional techniques. As shown, by employing the techniques disclosed herein, the evaluators achieved significant reductions in memory usage. In the case of the blend object file (see FIG. 8A), the disclosed techniques used less than half of the memory of conventional techniques. In the case of the first ellipses object file (see FIG. 8B), the disclosed techniques used less than one-quarter of the memory of conventional techniques. Overall, as shown, the disclose techniques provide significant benefits in computational time and memory than prior techniques.

Figure 9:
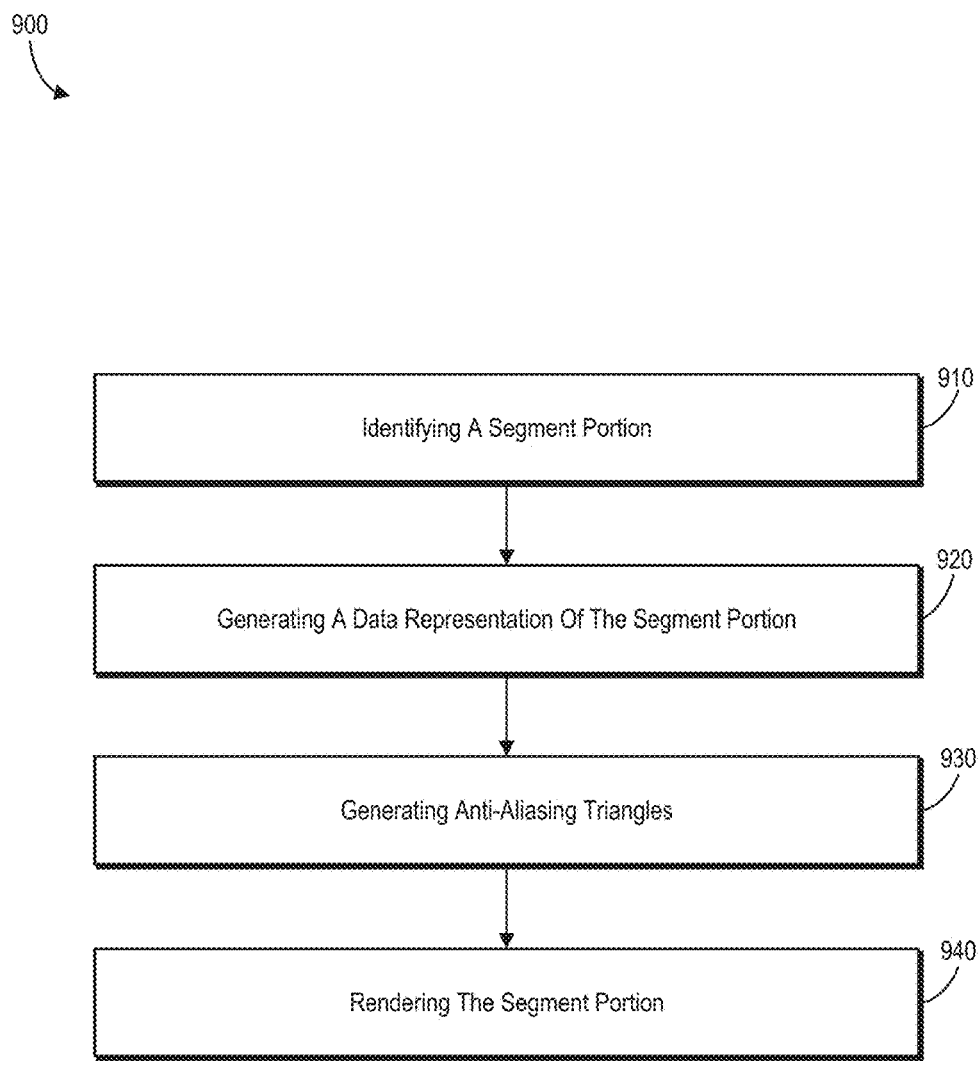
FIG. 9 illustrates a flowchart of a series of acts in a method of rendering cubic Bezier splines to produce anti-aliased splines in accordance with one or more embodiments.

FIGS. 1-8, the corresponding text, and the examples provide a number of different systems, methods, techniques, components, and/or devices of the rendering system 106 in accordance with one or more embodiments. In addition to the above description, one or more embodiments can also be described in terms of flowcharts including acts in a method for accomplishing a particular result. For example, FIG. 9 illustrates a flowchart of an exemplary method in accordance with one or more embodiments described herein. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

FIG. 9 illustrates an example flow diagram of a method 900 for rendering cubic Bezier splines to produce anti-aliased splines. In one or more embodiments, the method 900 is implemented on a computing device, such as the client device 102. Further, in some embodiments, the method 900 is implemented in a digital environment for rendering vector-based graphics.

The method 900 includes an act 910 of identifying a segment portion. In particular, the act 910 can involve identifying a monotonic segment portion 200 of a cubic Bezier spline. In one or more embodiments, the act 910 includes identifying a segment of a vector-based object where the segment includes a start point, an end point, and a split point as well as identifying the monotonic segment portion between the start point and the split point of the segment. In some embodiments, the act 910 includes identifying a vector-based object in a digital document.

In various embodiments, the act 910 can also include classifying the segment as a loop, a cusp, or a serpentine; computing rendering values for the segment; determining a maximum point, a minimum point, or an inflection point within the segment based on the rendering values; and identifying the split point based on the maximum point, the minimum point, or the inflection point. In some embodiments, the act 910 further includes assigning, based on classifying the segment as a loop, a double point of the loop as the start point or end point of the segment.

As shown in FIG. 9, the method 900 further includes an act 920 of generating a data representation of the segment portion 208. In particular, the act 920 can involve generating a data representation of the segment portion, the data representation of the segment portion defining a control triangle 210, 310 that encompasses the segment portion 208, 308. In one or more embodiments, the act 902 includes generating the control triangle 210, 310 having an interior side 312 from the start point 202, 302 to the split point 206, 306, a start exterior side 314 from the start point 302 to a bisected point 318, and a split exterior side 316 from the split point 306 to the bisected point 318, where the control triangle 210, 310 fully encompasses the at least one segment portion 208, 308. In various embodiments, the act 920 is implemented on the CPU of a client device.

The method 900 also includes an optional act of generating an interior triangle 230, 330 based on the interior side 312 of the control triangle 310 and an inner point 220, 320 of the segment 200, 300, where the interior triangle 230, 330 connects the start point 202, 302, the inner point 220, 320, and the split point 206, 306. In some embodiments, the optional act additionally includes determining the inner point as a center-of-mass point of the segment based on the start point, the end point, and the split point. In various embodiments, the above act is implemented on the GPU of a client device.

As shown, the method 900 also includes an act 930 of generating anti-aliasing triangles. In particular, the act 930 can involve generating anti-aliasing triangles 340a-d that are offset from the segment portion 208, 308 based on attributes of the control triangle 310. In various embodiments, the act 930 includes determining antialiasing triangles 340a-d based on normal vectors 322, 326, 328 extending from the control triangle 310, where a first antialiasing triangle 340a of the antialiasing triangles 340a-d shares the start exterior side 314 of the control triangle 310 and a second antialiasing triangle of the antialiasing triangles 340a-d shares the split exterior side 316 of the control triangle 310. In one or more embodiments, the normal vectors extend one or two pixels from the control triangle and include a start normal vector, a split normal vector, and a bisected normal vector. In various embodiments, the act 930 is implemented on the GPU of a client device.

As shown in FIG. 9, the method 900 further includes an act 940 of rendering the segment portion. In particular, the act 960 can involve rendering the segment portion 208, 308 of the cubic Bezier spline 200, 300 based at least in part on pixel positions with respect to the control triangle 210, 310 and the anti-aliasing triangles 340a-d. In various embodiments, the act 940 includes rendering, on a display of a computing device 102, the at least one segment portion 208, 308 based on the control triangle 210, 310, the interior triangle 230, 330, and the antialiasing triangles 340a-d. In one or more embodiments, the act 940 includes rendering each pixel within the interior triangle to a given color, rendering at least one pixel within the control triangle to the given color based on a rendering value of the at least one pixel, and rendering at least one pixel within the antialiasing triangles to the given color based on the at least one pixel being within a threshold distance to the at least one segment portion. In additional embodiments, the act 940 further includes performing a quadratic approximation of the segment portion to render the at least one pixel within the antialiasing triangles to the given color.

The method 900 can also include a number of additional acts. In one or more embodiments, the method 900 includes the acts of extending the start normal vector from the start point to a start vector point, the start normal vector being tangent to the start exterior side; extending the split normal vector from the split point to a split vector point, the split normal vector being tangent to the split exterior side; and extending the bisected normal vector from the bisected point to a bisected vector point, the bisected normal vector equally dividing the tangent to the start exterior side and the tangent to the split exterior side; where the antialiasing triangles form an antialiasing area based on the start point, the start vector point, the bisected vector point, the split vector point, the split point, and the bisected point.

In one or more embodiments, the method 900 includes the act of maintaining a memory having a vector-based object with at least one monotonic cubic Bezier spline and segment information for a segment portion of the segment of the cubic Bezier spline. For example, the segment information includes an inner point of the segment, normal vectors that extend tangentially from the control triangle, and rendering values for the segment.

In some embodiments, the method 900 includes the act of determining a quadratic approximation of the segment portion to render the at least one pixel within the antialiasing triangles to the given color. In addition, the above act includes splitting segment portion into two quadratic segments to determine the closest distance between the two quadratic segments. In additional embodiments, the above act includes rendering the at least one pixel within the antialiasing triangles to a fractional value of the given color based on the closest distance of the at least one pixel between the two quadratic segments.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the rendering system to render cubic Bezier splines of a vector-based object within a digital document, as described herein.

Embodiments of the present disclosure can include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer executable instructions can be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
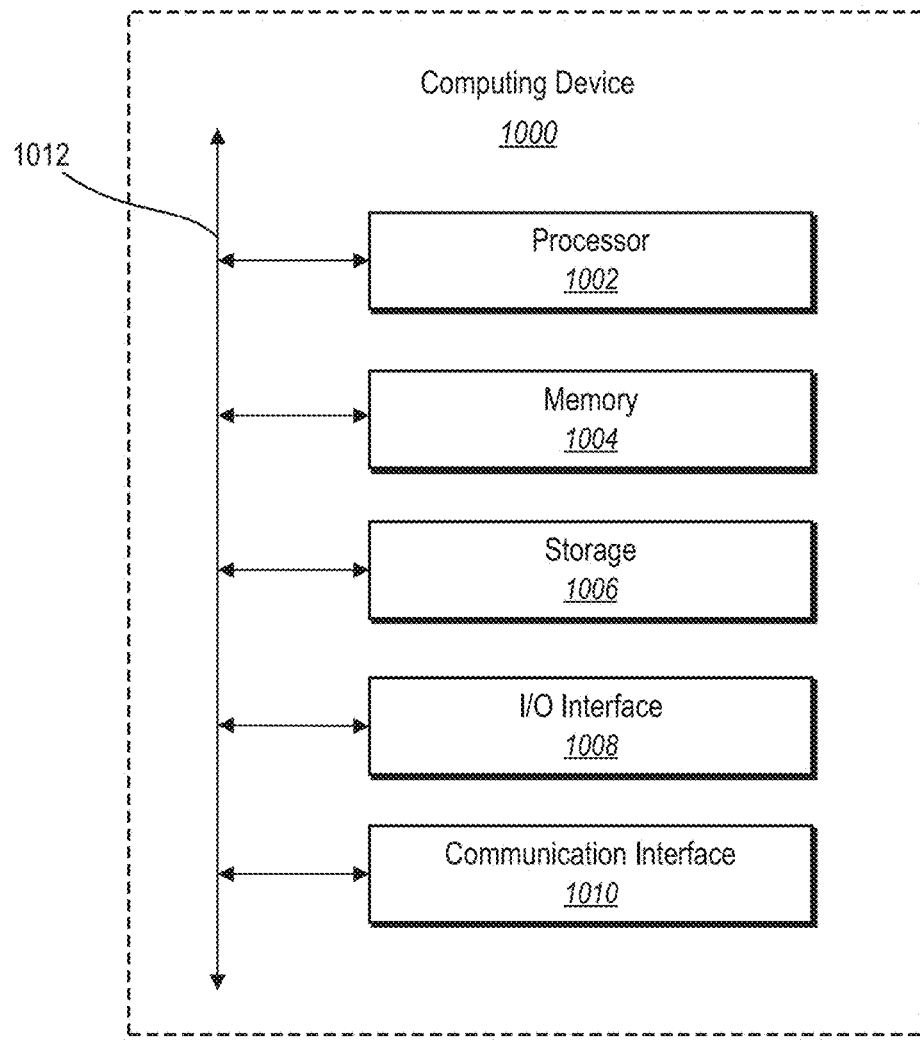
FIG. 10 illustrates a block diagram of an exemplary computing device for implementing one or more embodiments of the present disclosure.

FIG. 10 illustrates a block diagram of an exemplary computing device 1000 that can be configured to perform one or more of the processes described above. One will appreciate that one or more computing devices, such as the computing device 1000 can represent the client device 102 described above. In one or more embodiments, the computing device 1000 can be a mobile device (e.g., a mobile telephone, a smartphone, a PDA, a tablet, a laptop, a camera, a tracker, a watch, a wearable device, etc.). In some embodiments, the computing device 1000 can be a non-mobile device (e.g., a desktop computer or another type of client device). Further, the computing device 1000 can be a server device that includes cloud-based processing and storage capabilities.

As shown in FIG. 10, the computing device 1000 can include one or more processor(s) 1002, memory 1004, a storage device 1006, input/output ("I/O") interfaces 1008, and a communication interface 1010, which can be communicatively coupled by way of a communication infrastructure (e.g., bus 1012). While the computing device 1000 is shown in FIG. 10, the components illustrated in FIG. 10 are not intended to be limiting. Additional or alternative components can be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 can retrieve (or fetch) the instructions from an internal register, an internal cache, memory 1004, or a storage device 1006 and decode and execute them.

The computing device 1000 includes memory 1004, which is coupled to the processor(s) 1002. The memory 1004 can be used for storing data, metadata, and programs for execution by the processor(s). The memory 1004 can include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 can be internal or distributed memory.

The computing device 1000 includes a storage device 1006 includes storage for storing data or instructions. As an example, and not by way of limitation, the storage device 1006 can include a non-transitory storage medium described above. The storage device 1006 can include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 can include a mouse, keypad or a keyboard, a touch screen, camera, optical scanner, network interface, modem, other known I/O devices or a combination of such I/O interfaces 1008. The touch screen can be activated with a stylus or a finger.

The I/O interfaces 1008 can include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data can be representative of one or more graphical user interfaces and/or any other graphical content as can serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 can include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention can be embodied in other specific forms without departing from its spirit or essential characteristics. The described embodiments are to be considered in all respects only as illustrative and not restrictive. For example, the methods described herein can be performed with fewer or more steps/acts or the steps/acts can be performed in differing orders. Additionally, the steps/acts described herein can be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for rendering vector-based graphics, a computer-implemented method of rendering convex geometry bounded by cubic Bezier splines, the method comprising:

identifying a monotonic segment portion of a cubic Bezier spline;
generating a data representation of the segment portion, the data representation of the segment portion defining a control triangle that encompasses the monotonic segment portion;
generating, at a graphics processing unit (GPU) of a computing device and based on attributes of the control triangle, anti-aliasing triangles that are offset from the monotonic segment portion; and
rendering, at the GPU of the computing device, the monotonic segment portion of the cubic Bezier spline based at least in part on pixel positions with respect to the control triangle and the anti-aliasing triangles.

2. The method of claim 1, wherein identifying the monotonic segment portion of the cubic Bezier spline comprises:
identifying a segment of a vector-based object, the segment comprising a start point, an end point, and a split point; and
identifying the monotonic segment portion between the start point and the split point of the segment.

3. The method of claim 2, wherein identifying the monotonic segment portion further comprises:
classifying the segment as a loop, a cusp, or a serpentine;
computing rendering values for the segment;
determining a maximum point, a minimum point, or an inflection point within the segment based on the rendering values; and
identifying the split point based on the maximum point, the minimum point, or the inflection point.

4. The method of claim 2, wherein a central processing unit (CPU) of the computing device generates the data representation of the monotonic segment portion.

5. The method of claim 2, wherein defining the control triangle that encompasses the monotonic segment portion comprises generating the control triangle having an interior side from the start point to the split point, a start exterior side from the start point to a bisected point, and a split exterior side from the split point to the bisected point.

6. The method of claim 5, further comprising generating an interior triangle based on the interior side of the control triangle and an inner point of the segment, wherein the interior triangle connects the start point, the inner point, and the split point, wherein the inner point is determined as a center-of-mass point of the segment based on the start point, the end point, and the split point.

7. The method of claim 6, wherein:
generating anti-aliasing triangles that are offset from the monotonic segment portion comprises determining the anti-aliasing triangles based on normal vectors extending from the control triangle, wherein a first anti-aliasing triangle of the anti-aliasing triangles shares the start exterior side of the control triangle and a second anti-aliasing triangle of the anti-aliasing triangles shares the split exterior side of the control triangle; and
the normal vectors extend one or two pixels from the control triangle.

8. The method of claim 7, wherein rendering the monotonic segment portion of the cubic Bezier spline further comprises rendering, on a display of the computing device, the monotonic segment portion based on the control triangle, the interior triangle, and the anti-aliasing triangles by:
rendering each pixel within the interior triangle to a given color;
rendering at least one pixel within the control triangle to the given color based on a rendering value of the at least one pixel; and
rendering at least one pixel within the anti-aliasing triangles to the given color based on the at least one pixel being within a threshold distance to the monotonic segment portion.

9. The method of claim 8, further comprising performing a quadratic approximation of the monotonic segment portion to render the at least one pixel within the anti-aliasing triangles to the given color.

10. A system that renders convex geometry bounded by cubic Bezier splines to produce anti-aliased vector-based graphics, the system comprising:
a memory that stores a vector-based object comprising a cubic Bezier spline; and
at least one computing device communicatively coupled to the memory, the at least one computing device comprising:
a central processing unit (CPU) that:
identifies a segment of the cubic Bezier spline;
generates a control triangle that encompasses a monotonic segment portion from the segment of the cubic Bezier spline; and
a graphics processing unit (GPU) that:
receives, from the CPU, a data representation of the segment comprising the control triangle that encompasses the monotonic segment portion;
generates an interior triangle and anti-aliasing triangles based at least in part on the control triangle; and
renders the monotonic segment portion based on the control triangle, the interior triangle, and the anti-aliasing triangles.

11. The system of claim 10, wherein the CPU further:
identifies an inner point within the segment;
determines normal vectors extending tangentially from the control triangle;
computes rendering values for the segment; and
wherein the data representation associated with the segment further comprises the inner point, normal unit vectors and rendering values.

12. The system of claim 11, wherein the GPU further:
generates the interior triangle based on a start point, a split point, and an inner point of the segment;
determines the anti-aliasing triangles based on the normal unit vectors; and
renders the monotonic segment portion further based on the rendering values of the segment.

13. The system of claim 10, wherein the GPU further renders the monotonic segment portion by:
rendering each pixel within the interior triangle to a given color;
rendering at least one pixel within the control triangle to the given color based on a rendering value of the at least one pixel; and
rendering at least one pixel within the anti-aliasing triangles to the given color based on the at least one pixel being within a threshold distance to the segment portion.

14. The system of claim 13, wherein the GPU further performs quadratic approximation of the monotonic segment portion to render the at least one pixel within the anti-aliasing triangles to the given color.

15. The system of claim 14, wherein performing a quadratic approximation of the monotonic segment portion further comprises splitting segment portion into two quadratic segments to determine a closest distance between the two quadratic segments.

16. The system of claim 15, wherein the GPU further renders the at least one pixel within the anti-aliasing triangles to a fractional value of the given color based on the closest distance of the at least one pixel between the two quadratic segments.

17. The system of claim 10, wherein the GPU further caches the data representation associated with the segment within the memory.

18. In a digital medium environment for rendering vector-based graphics, a computer-implemented method of rendering convex geometry bounded by cubic Bezier splines to produce anti-aliased vector-based splines, the method comprising:
   identifying a segment of a vector-based object, the segment comprising a start point, an end point, and a split point, wherein the segment is a cubic Bezier spline segment;
   generating control triangles based on the start point, the end point, and the split point, wherein the control triangles fully encompass the segment; and
   performing a step for rendering the segment on a display of a computing device based on the control triangles, generated interior triangles, and generated anti-aliasing triangles.

19. The method of claim 18, further comprising performing the step of rendering the segment by a graphics processing unit on the computing device.

20. The method of claim 18, wherein performing the step of rendering the segment further comprises applying anti-aliasing to the segment based on the anti-aliasing triangles.

* * * * *